(12) United States Patent
Prado et al.

(10) Patent No.: US 6,867,695 B2
(45) Date of Patent: Mar. 15, 2005

(54) OBJECT STORAGE AND TRACKING SYSTEM, AN OBJECT TRACKING UNIT AND A CONTAINER FOR OBJECT TRACKING UNITS

(75) Inventors: Ronald J. Prado, Peachtree City, GA (US); Thomas R. Collins, Smyrna, GA (US)

(73) Assignee: Key Register Systems, Inc., Irvine, CA (US)

( * ) Notice: Subject to any disclaimer, the term of this patent is extended or adjusted under 35 U.S.C. 154(b) by 152 days.

(21) Appl. No.: 10/059,043

(22) Filed: Jan. 30, 2002

(65) Prior Publication Data

US 2002/0113706 A1 Aug. 22, 2002

Related U.S. Application Data

(60) Provisional application No. 60/265,824, filed on Feb. 1, 2001.

(51) Int. Cl.[7] .............................................. A08B 13/14
(52) U.S. Cl. ............................ 340/568.1; 340/568.7; 340/572.8
(58) Field of Search ........................ 340/568.1, 568.2, 340/568.7, 572.1, 572.2, 572.4, 572.7, 572.8, 572.9, 5.8, 5.91, 825.36, 10.51, 10.52; 235/375, 383, 385

(56) References Cited

U.S. PATENT DOCUMENTS

| | | | |
|---|---|---|---|
| 3,975,722 A | 8/1976 | Adler et al. | |
| 4,205,328 A | 5/1980 | Gotanda | |
| 4,549,170 A | 10/1985 | Serres et al. | |
| 4,595,922 A | 6/1986 | Cobb et al. | |
| 4,635,053 A | 1/1987 | Banks et al. | |
| 4,661,806 A | 4/1987 | Peters et al. | |
| 4,673,915 A | 6/1987 | Cobb | |
| 5,038,023 A | 8/1991 | Saliga | |
| 5,038,123 A | 8/1991 | Brandon | |
| 5,801,628 A | 9/1998 | Maloney | |

(List continued on next page.)

FOREIGN PATENT DOCUMENTS

| | | | |
|---|---|---|---|
| WO | WO 95/04324 | | 2/1995 |
| WO | WO 95/12858 | | 5/1995 |
| WO | WO 97/09687 | * | 3/1997 |

OTHER PUBLICATIONS

"DS2407 Dual Addressable Switch Plus Memory 1K–Bit Memory", Data Sheet, Copyright 1995, Dallas Semiconductor, pp. 1–31.
Dan Awtrey, "MicroLAN Design Guide", Copyright 1998, Dallas Semiconductor.
"50 Ways to Touch Memory", Third Edition, Aug. 1994, Dallas Semiconductor.
Dallas Semiconductor Corporation, "Application Note 104: Minimalist Temperature Control Demo", pp. 1901–1904, at http://web.archive.org/web19961102012829/www.dalsemi.com/DocControl/PDFs/app104.pdf (1995).
Dallas Semiconductor Corporation, "Application Note 106: Complex MicroLANs", pp. 1905–1919, at http://web.archive.org/web/19961102012933/www.dalsemi.com/DocControl/PDFs/app106.pdf (1995).

Primary Examiner—Van T. Trieu

(57) ABSTRACT

A system for tracking objects. A plurality of electrical receptacles are provided each at a corresponding storage location in the container. A plurality of object tracking units are provided, each having a plug capable of mating with any one of the electrical receptacles. Each object tracking unit having an object attachment member to attach to an object to be tracked and a memory device storing a unique identifier which can be accessed via the data line. A controller couples to the electrical receptacles to read the identifier of a memory device of an object tracking unit when its plug is installed in any electrical receptacle.

32 Claims, 23 Drawing Sheets

U.S. PATENT DOCUMENTS

| | | | |
|---|---|---|---|
| 5,946,278 | A | 8/1999 | Tower |
| 6,075,441 | A | 6/2000 | Maloney |
| 6,131,808 | A | 10/2000 | Pires et al. |
| 6,195,005 | B1 | 2/2001 | Maloney |
| 6,204,764 | B1 | 3/2001 | Maloney |
| 6,232,876 | B1 | 5/2001 | Maloney |
| D444,331 | S | 7/2001 | Maloney |
| 6,262,664 | B1 | 7/2001 | Maloney |
| 6,317,044 | B1 | 11/2001 | Maloney |
| D456,852 | S | 5/2002 | Maloney |
| 6,392,543 | B2 | 5/2002 | Maloney |
| 6,407,665 | B2 | 6/2002 | Maloney |
| 6,424,260 | B2 | 7/2002 | Maloney |
| 6,427,913 | B1 | 8/2002 | Maloney |
| 6,501,379 | B2 | 12/2002 | Maloney |
| 2001/0004235 | A1 | 6/2001 | Maloney |
| 2001/0006368 | A1 | 7/2001 | Maloney |
| 2001/0009397 | A1 | 7/2001 | Maloney |
| 2001/0022552 | A1 | 9/2001 | Maloney |
| 2002/0014961 | A1 | 2/2002 | Maloney |
| 2002/0044055 | A1 | 4/2002 | Maloney |
| 2002/0075154 | A1 | 6/2002 | Maloney |
| 2002/0145520 | A1 | 10/2002 | Maloney |
| 2003/0052782 | A1 | 3/2003 | Maloney |

\* cited by examiner

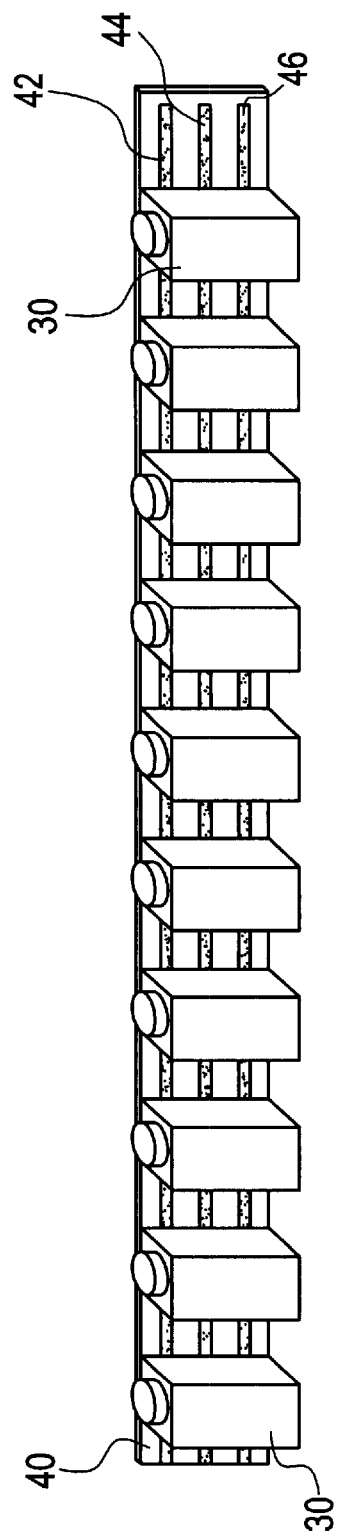
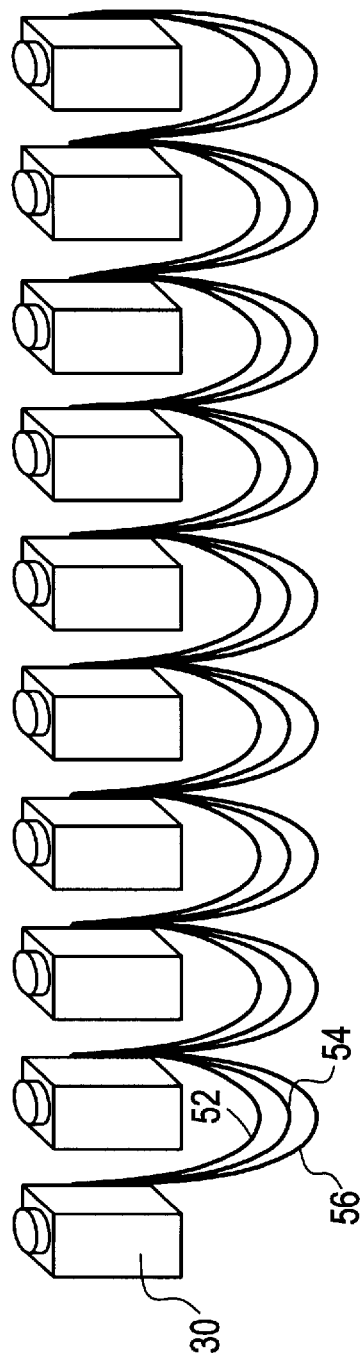
FIG. 4
FIG. 5

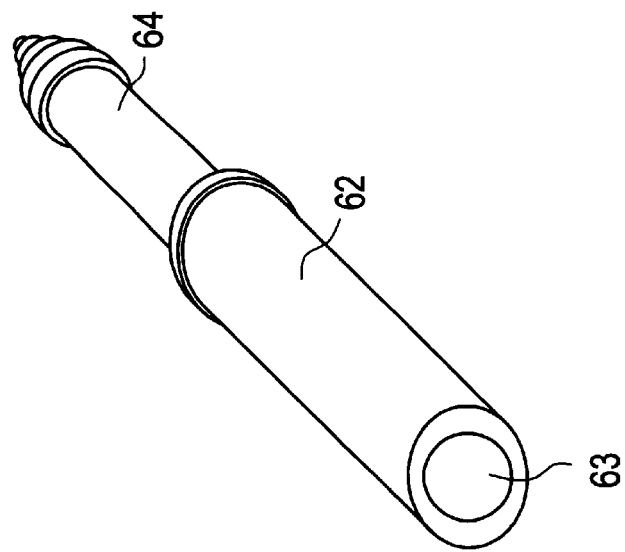
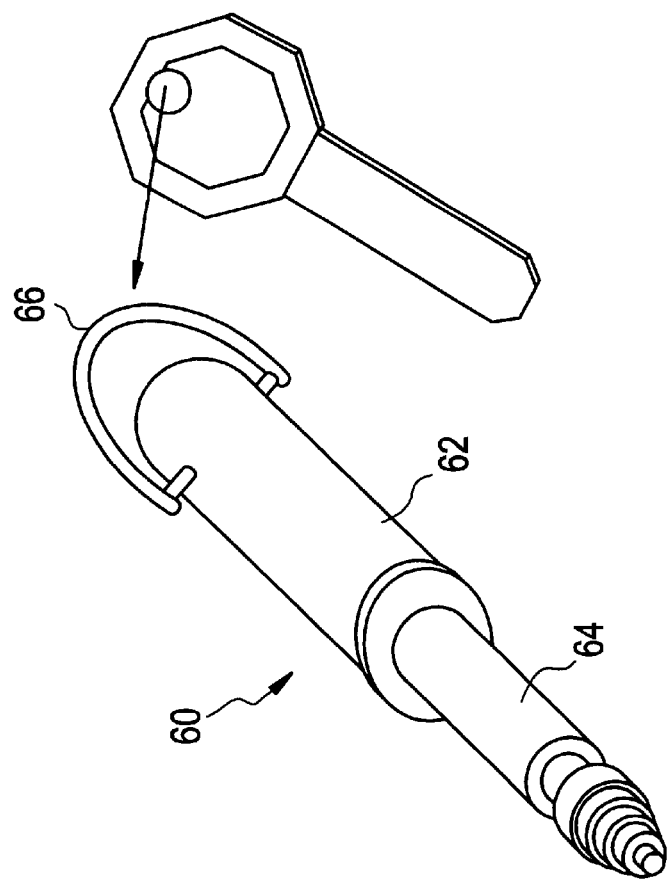

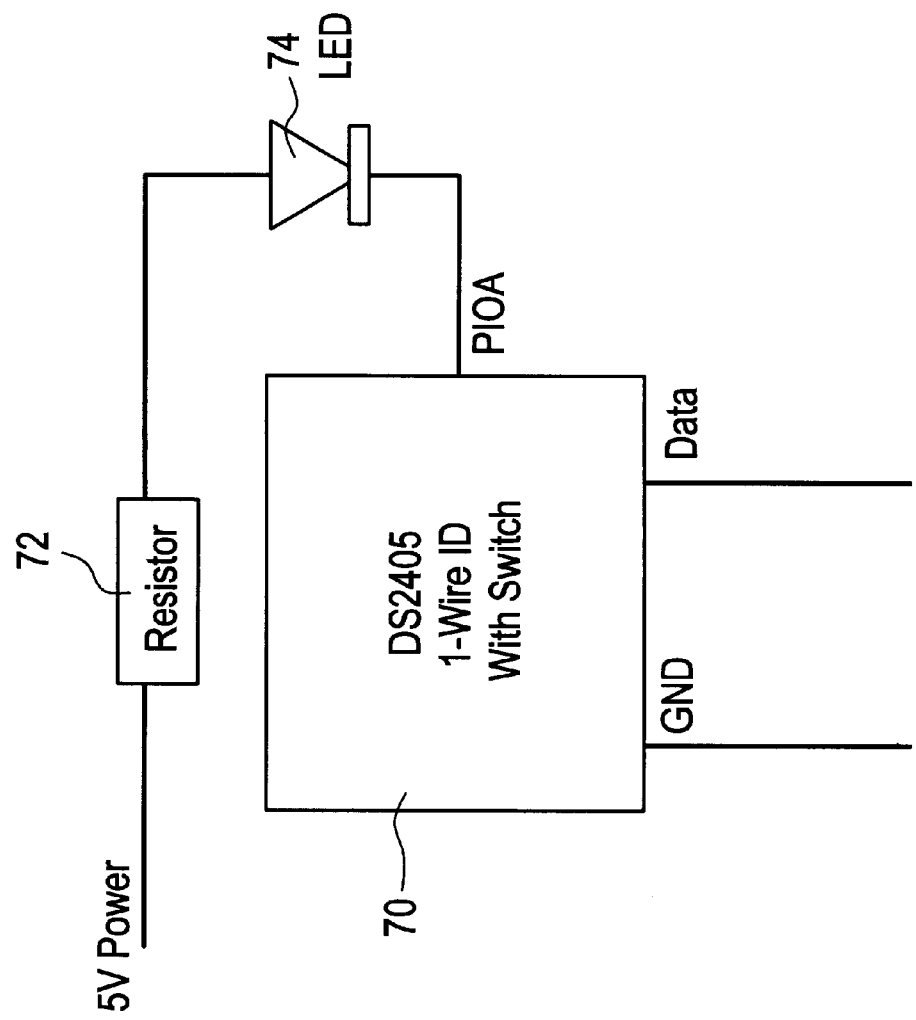

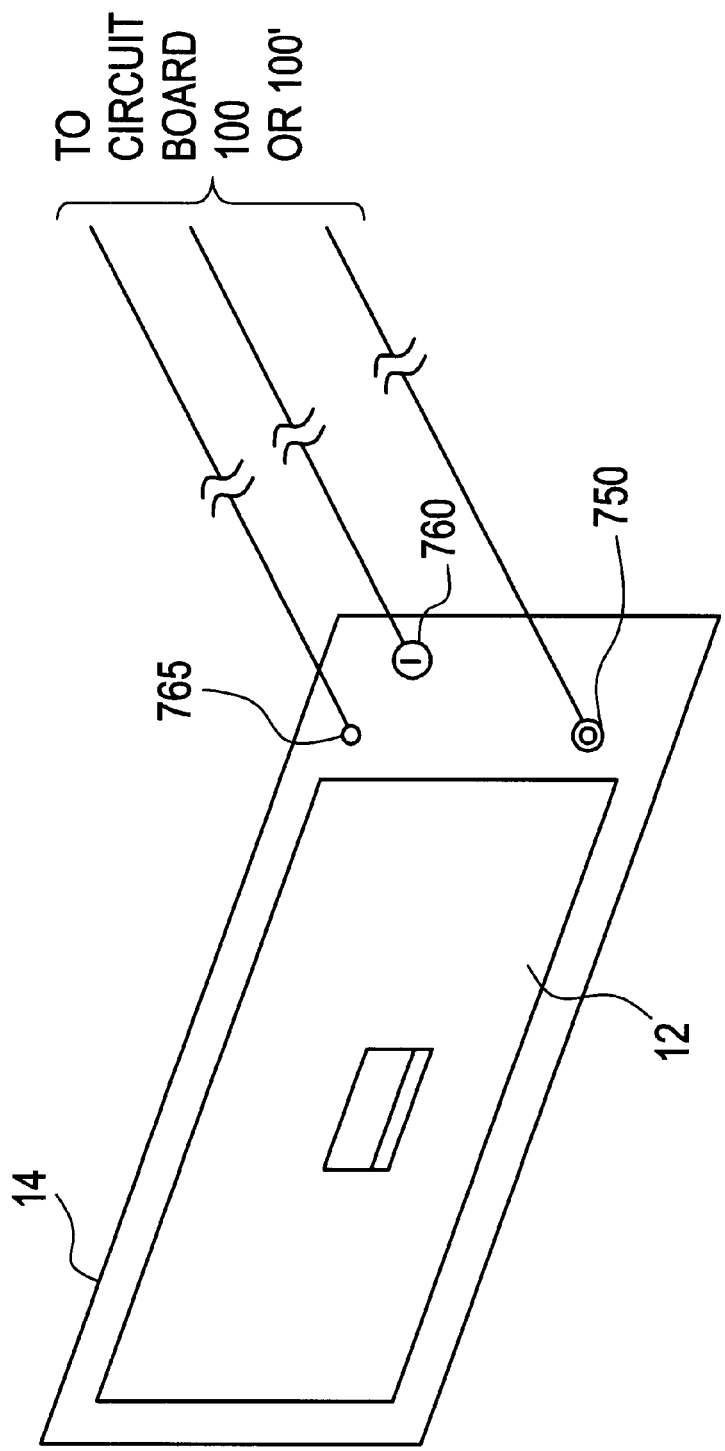

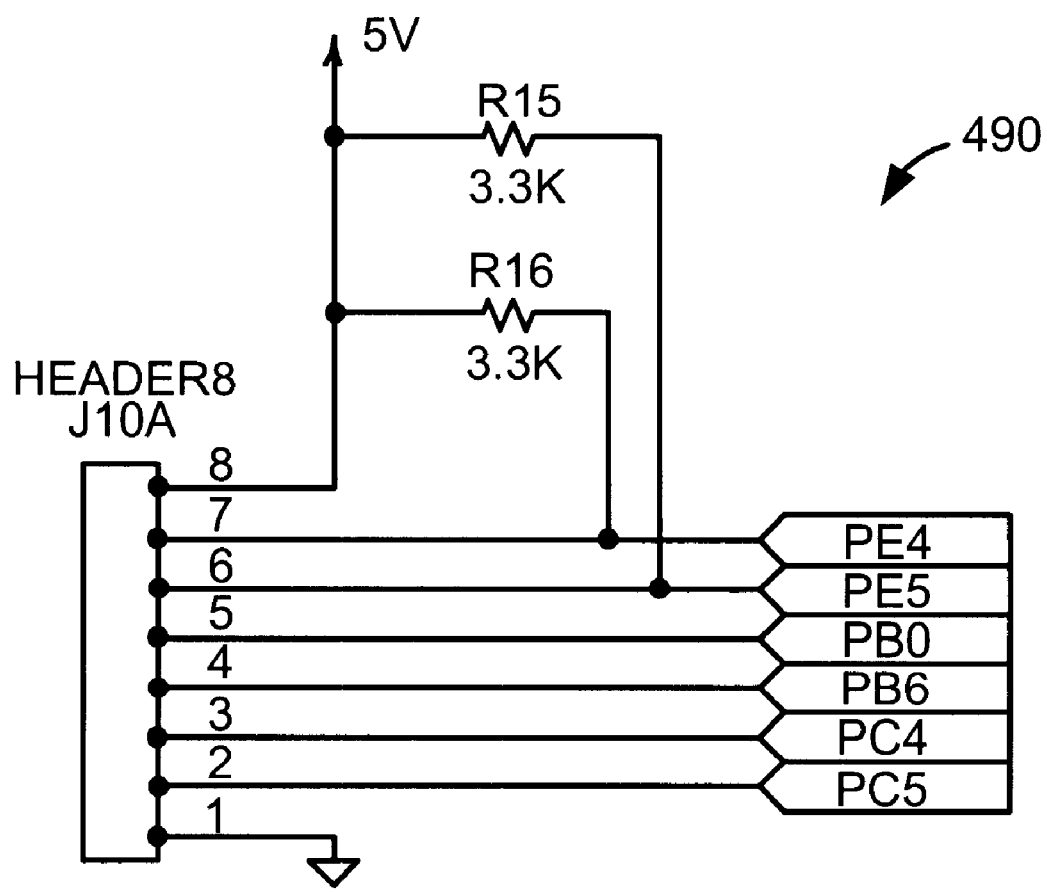

OBJECT STORAGE AND TRACKING SYSTEM, AN OBJECT TRACKING UNIT AND A CONTAINER FOR OBJECT TRACKING UNITS

This application claims priority to U.S. Provisional Application No. 60/265,824 filed Feb. 1, 2001, the entirety of which is incorporated herein by reference.

BACKGROUND OF THE INVENTION

The present invention is directed to object tracking and storage systems, and more particularly to an object tracking and storage system that monitors objects regardless of their location in a storage receptacle, to an object tracking unit and to a container for storing object tracking units.

Systems for tracking objects are useful for security and other reasons. For example, automobile dealers must monitor the location of keys for the vehicles that are in inventory. There are many systems of this general type known in the art. However, many of these known systems are more complex than they need to be. Generally, there is room for improving object tracking systems in terms of cost, functionality and maintenance.

SUMMARY OF THE INVENTION

Briefly, the present invention is directed to an object tracking system useful to track objects, such as keys in an automobile dealer environment. The system comprises a container; a plurality of storage locations in the container; a plurality of electrical jacks each at a corresponding storage location. The plurality of electrical jacks are electrically connected together in series. There are a plurality of object tracking units in the form of plug units capable of mating with any one of the electrical jacks. Each plug unit comprises an object attachment member to attach to an object to be tracked and a memory device storing a unique identifier that can be accessed via a data line. A controller couples to the data line to read the identifier of any memory device of a plug unit when the plug unit is installed in any electrical jack.

The above and other objects and advantages of the present invention will become more readily apparent when reference is made to the following description taken in conjunction with the accompanying drawings.

BRIEF DESCRIPTION OF THE DRAWINGS

FIG. 4 is a side view of a string of jacks showing electrical connection between jacks according to one embodiment.

FIG. 5 is a side view of a string of jacks showing electrical connection between jacks according to another embodiment.

FIGS. 7 and 8 are perspective views of the plug units according to the present invention.

FIG. 11 is a schematic diagram of the circuit in each plug unit.

FIG. 12B is a perspective view of the front of the drawer system showing elements on the front of the drawer chassis that are connected to the control system.

FIG. 19C is a schematic diagram of the auxiliary interfaces.

DETAILED DESCRIPTION OF THE INVENTION

Figure 1:
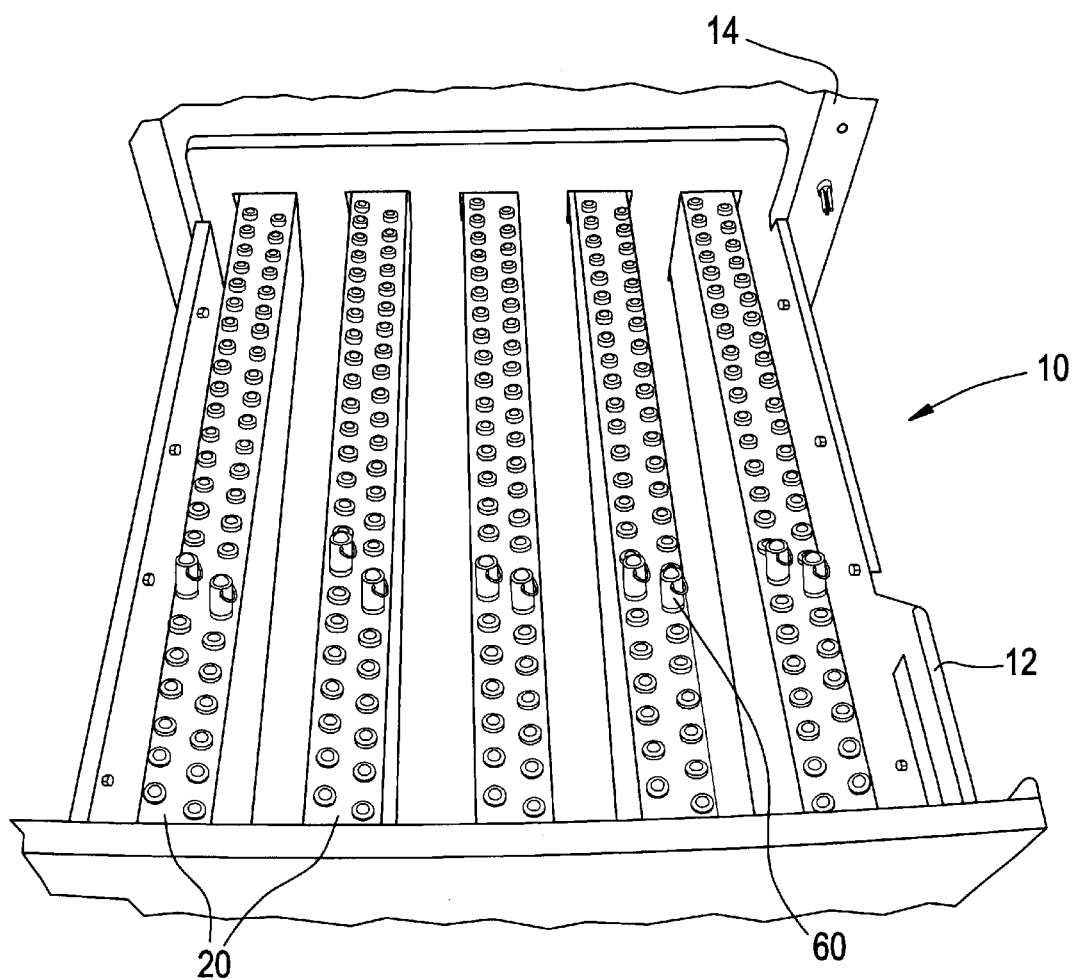
FIG. 1 is a top view of the storage drawer according to the present invention.
Figure 2:
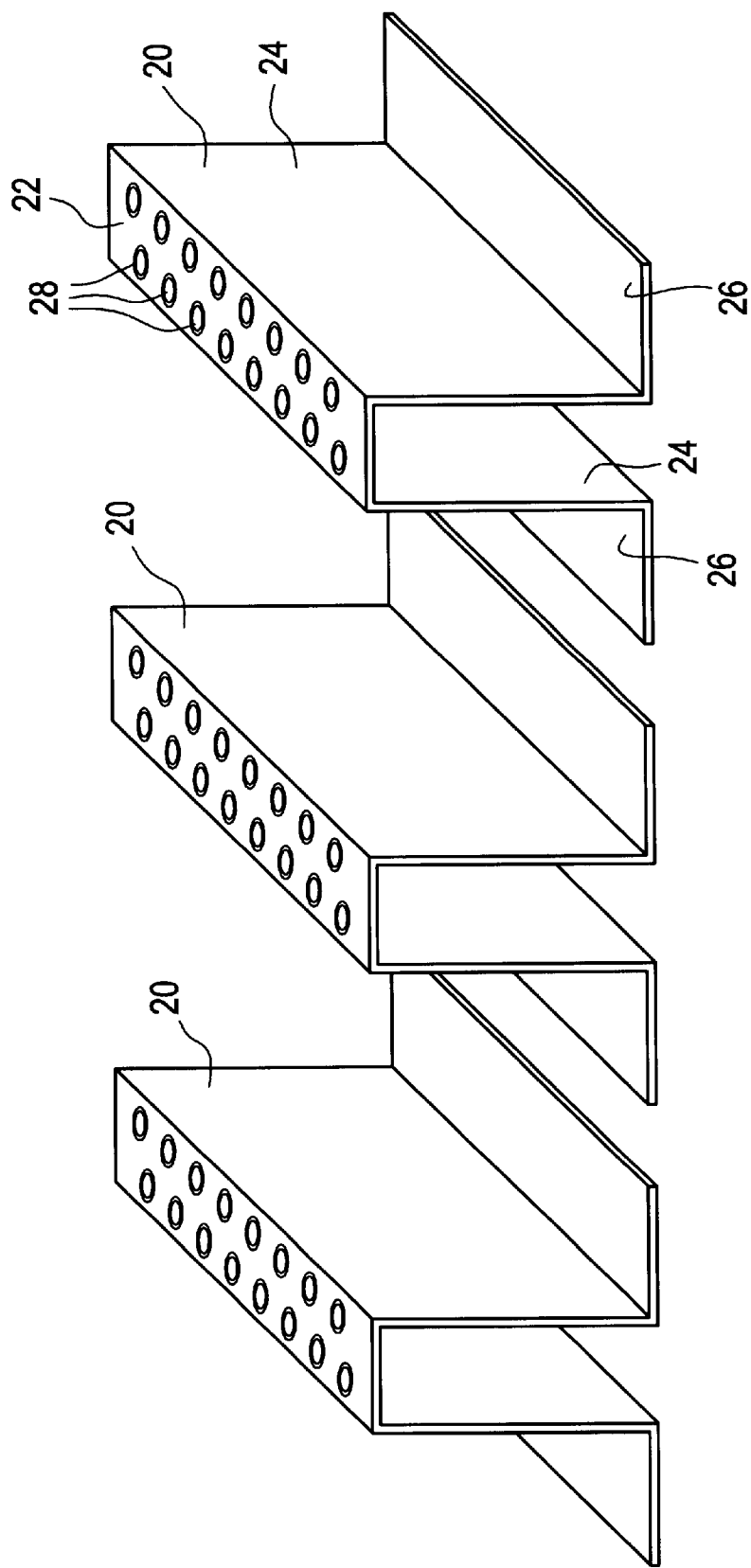
FIG. 2 is a perspective view of inverted channels that are disposed in the drawer according to the present invention.
Figure 3:
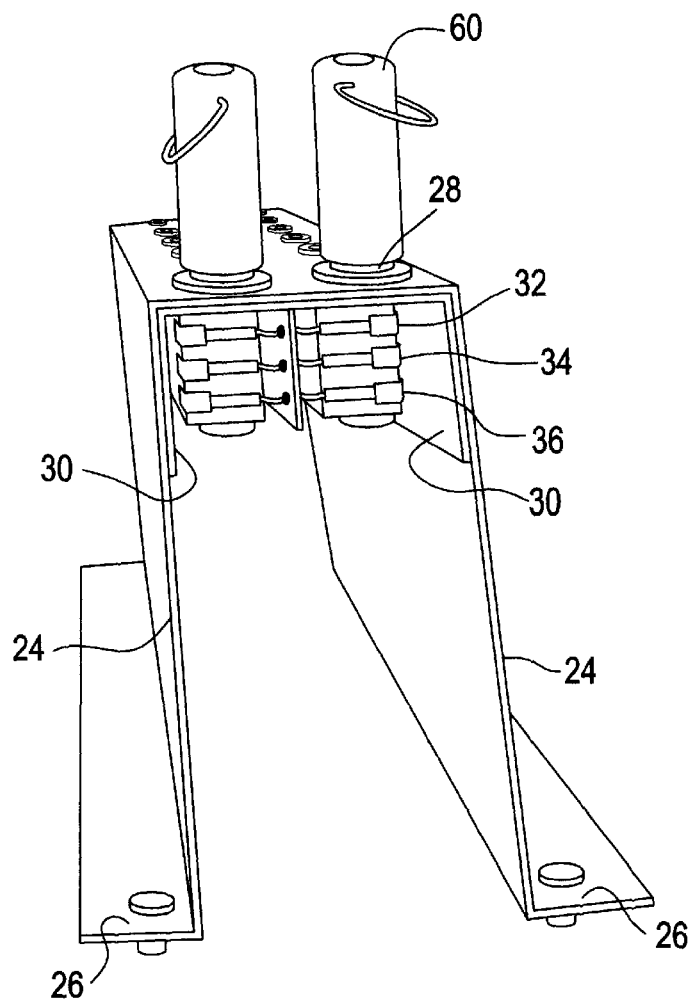
FIG. 3 is an end view of a single channel.

Referring first to FIGS. 1–3, a drawer system 10 is shown comprising a drawer body 12 comprising a closed bottom and an open top. Disposed on the bottom surface of the drawer are a plurality of inverted metal channels 20, each having a squared-off inverted "U" shape. There is at least one, but usually several channels 20 mounted in a drawer 12. The channels 20 comprise a horizontal surface 22, two side vertical surfaces 24 and two feet 26. There are a plurality of holes or openings 28 in the horizontal surface 22 of the channels 20 through which are mounted a plurality of electrical jacks 30. In order to maximize the number of jacks 30 in a drawer 10, the jacks 30 may be staggered or offset in multiple strings per channel. For example, in a single drawer, there may be five channels, each supporting 50 jacks in two staggered strings of 25 jacks. The feet 26 of the channels 20 attach to the bottom surface of the drawer with, for example, pins welded to the feet 26. Plug units 60 fit into the jacks 30. The plug units 60 will be described in greater detail hereinafter in conjunction with FIGS. 7–11. The jacks 30 are, for example, standard audio jacks each capable of receiving a ¼ inch audio plug. Each jack 30 is secured to the channel 20 with a nut on the top of the horizontal surface 22 that threads around the top opening of the jack 20. A variation to the design described above is one in which a single structure supports all of the jacks.

Figure 6:
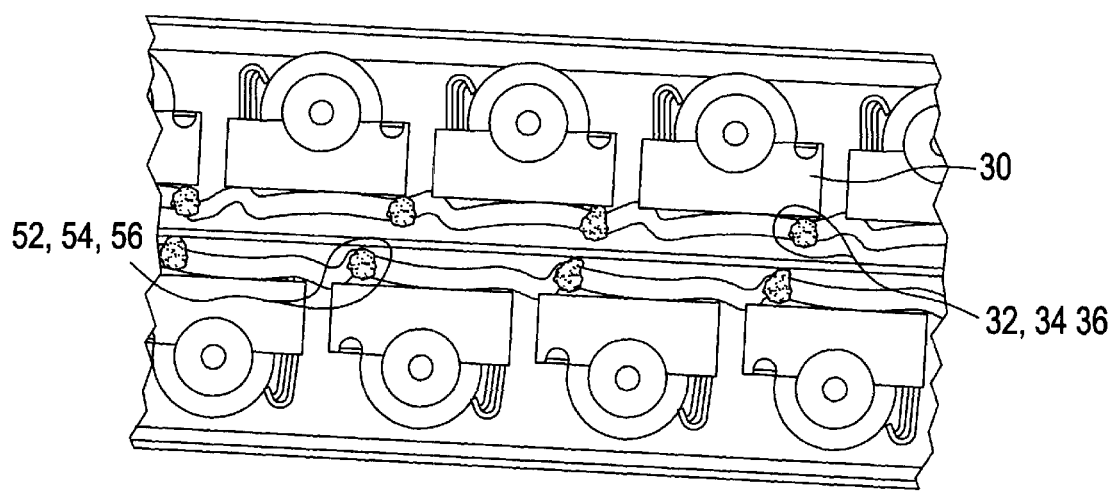
FIG. 6 is an enlarged bottom view of a metal channel.

There are three terminals 32, 34 and 36 on each jack and therefore three wires 52, 54 and 56 or connections are made to each jack: a data line or connection for transporting data or control information, a power supply line, and a ground line. The data line may supply power to the memory device of a plug unit (described hereinafter) inserted in a jack, while the dedicated power line is available to supply power to the LED (described hereinafter) of a plug unit in a jack. There are numerous ways to electrically connect the jacks 30 together. As shown in FIG. 4, one way to connect them is to provide a ribbon, cable or printed circuit board 40 having printed or embedded therein the three wires shown at reference numerals 42, 44 and 46. The three contact terminals 32, 34 and 36 on each jack are inserted into or soldered onto the three wires on the ribbon, cable or printed circuit board panel 40. All of the jacks 30 in a channel share a common ground. Wires 52, 54 and 56 are electrically connected between jacks 30. Another connection method is to solder discrete wires 52, 54 and 56 between the corresponding three terminals 32, 34 and 36 of each jack 30 as shown in FIGS. 3, 5 and 6. These discrete wires connect from one jack to the next. Still another configuration is to attach three uninsulated wires across the string of jacks similar to that shown in FIG. 4, but without the circuit board 40. This latter configuration is essentially a hybrid of the configuration shown in FIGS. 4 and 5. As a further alternative, the jacks 30 may be formed from an injection molding process creating an integrated structure capable of receiving the plug units, and having electrical connections of any of the variety described above.

Turning to FIGS. 7–11, the plug units 60 will be described in detail. Each plug unit 60 comprises an elongated housing 62. An electrically conductive plug member 64 with three contacts extends outward from one end of the housing 62. The plug unit 60 is designed to attach or otherwise be associated with an object to be tracked. For example, if the object to be tracked is a key shown in FIG. 7, an attachment ring 66 is provided on the housing 62 that can be used to attach keys or other objects. The key can be attached to the attachment ring 66 with metal straps, tie wraps or other means. On the top end of the plug unit 60, a translucent or transparent lens cap 63 may be provided for an LED described hereinafter.

Figure 9:
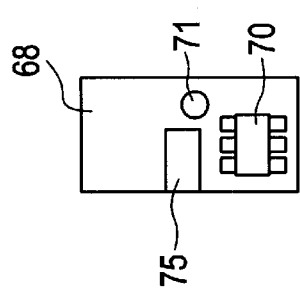
FIGS. 9 and 10 are views of each side of the circuit board in each plug unit according to the present invention.
Figure 10:
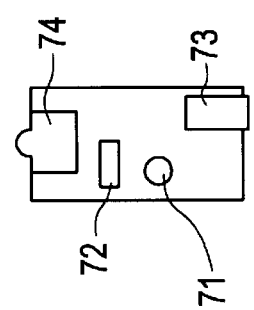

As shown in FIGS. 9 and 10, contained inside the housing 62 is a circuit board 68 that is electrically connected to the plug member 64 as explained further hereinafter. There are many possible configurations of the elements on the circuit board 68. As one example, on one side of the circuit board 68 (FIG. 9), a memory device 70 is mounted. The memory device 70 is, for example, a DS2405 addressable switch device manufactured and sold by Dallas Semiconductor. The DS2405 device provides a means for assigning an electronically readable identification to a particular node or location with additional control capability provided by an open drain N-channel MOSFET that can be remotely switched and sensed via communication over a one-wire bus. The DS2405 contains a factory-lasered registration number that includes a unique 48-bit serial number which provides a unique electronic identification for the device itself but also is a means to locate and change or read the state of the switch (open or closed) that is associated with it. Thus, the memory device 70 stores a unique identifier to be associated with an object to be tracked. One advantage of using the specific type of memory device identified above is that it is capable of being electrically accessed for read and write operations with one wire, i.e., the data line, connected to it. On that same side, there is a conductive surface 75 for ground that is soldered to a ground conductive surface/tab of the plug member 64. There is a hole 71 through the circuit board 68 having a conductive surface around the inner surface for coupling power to a power plug tab on the plug member. On the opposite side of the circuit board (FIG. 10) a resistor 72 is mounted and a conductive surface 73 is provided for data that is soldered to a data surface/tab of the plug member 64. Extending from the end of the circuit board is an LED 74 that is connected through the resistor 72 to the memory device 70. The circuit board 68 is mounted inside the housing 62 of the plug unit 60 so that the LED 74 is adjacent the lens cap 63 to communicate light outward from the housing 62.

FIG. 11 shows the schematic connections for the electrical components inside the housing 62 of the plug unit 60. Current-limited (5V) power comes in to the circuit board and is supplied through an optional resistor 72 to the LED 74. The ground and data lines connect to corresponding ground and data terminals on the memory device 70. The memory device 70 stores a unique identifier to be associated with an object to be tracked and is suitably powered when it receives a signal on its data terminal. The LED 74 is illuminated when instructed to do so by the master controller. When the plug unit 60 is inserted into a jack 30, the plug member of the plug unit makes electrical connections to each of the data, power and ground lines in the jack so as to provide access and control over the memory device 70 in a plug unit.

Figure 12A:
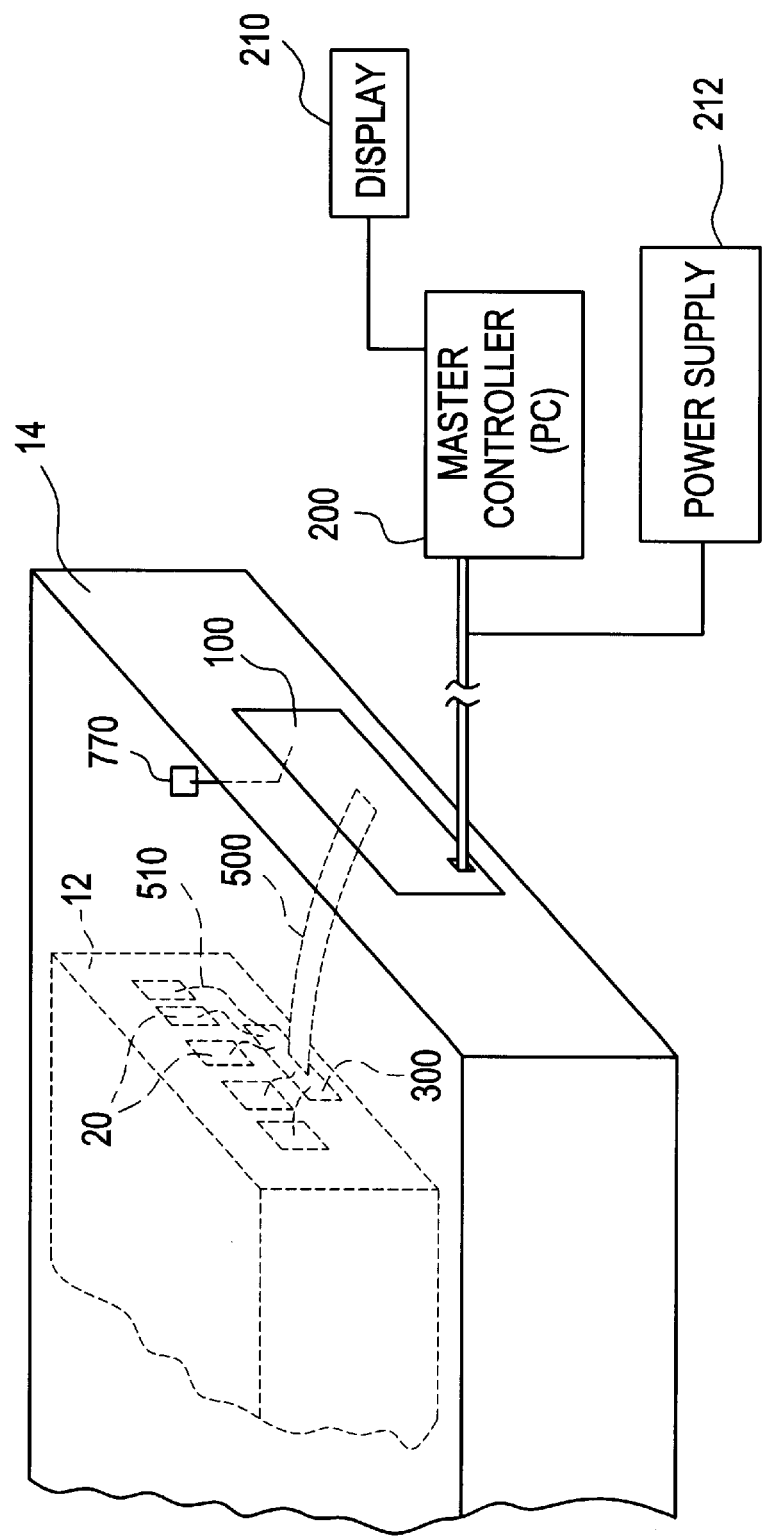
FIG. 12A is a perspective view of the rear of the drawer system showing the connection between circuit control boards of the control system.

There are many possible configurations for the control system of the drawer system. One configuration is shown in FIG. 12A where the control system comprises two circuit boards: a first board 100 that may be mounted on the rear wall of the drawer chassis, and a second circuit board 300 that may be mounted on the back wall of the drawer 12. The circuit board 100 and the circuit board 300 are connected together by a cable or ribbon 500. Moreover, the circuit board 300 connects to the jacks on each channel 20 of the drawer 12 by separate electrical connections 510, such as RJ11 telephone line-type wires and connectors. The circuit board 300 interfaces a string of jacks in one or more drawers to the circuit board 100, which in turns interfaces to a controller, such as a personal computer (PC) 200, which has an associated display 210. Power is supplied to the jacks by a power supply 212.

FIG. 12B shows the front panel of the drawer 12 and the drawer chassis 14. On the front of the drawer chassis 14, there are a front panel jack 750, a door lock 760, and a power indicator LED 765. These elements are electrically connected to the circuit board 100 or 100' as described hereinafter. The door lock 760 is a solenoid-driven door lock that can be controlled to lock or unlock the drawer. The status of the door lock 760 (lock/unlock) is provided to the controller. In addition, the door lock 760 may also be locked and unlocked using a key. The front panel jack 750 is used to allow plug unit identification without having to open the drawer. The front panel jack 750 is used to allow the user to access the system (e.g., log the user in). When a user places a "personal"plug unit into the front panel jack 750, the identification of the plug unit is obtained and compared against a user database. If a match occurs, the user is logged into the software managed by the master controller (described hereinafter).

The other use of the front panel jack 750 is to create database entries for plug units. The user creates a new database entry for an object (e.g., car keys), and then places the associated plug unit into the front panel jack. The software executed by the master controller then reads the unique identification of the plug unit, turns on the LED in the plug unit (in part to verify that the LED works), and associates the plug unit with the database entry.

Figure 13:
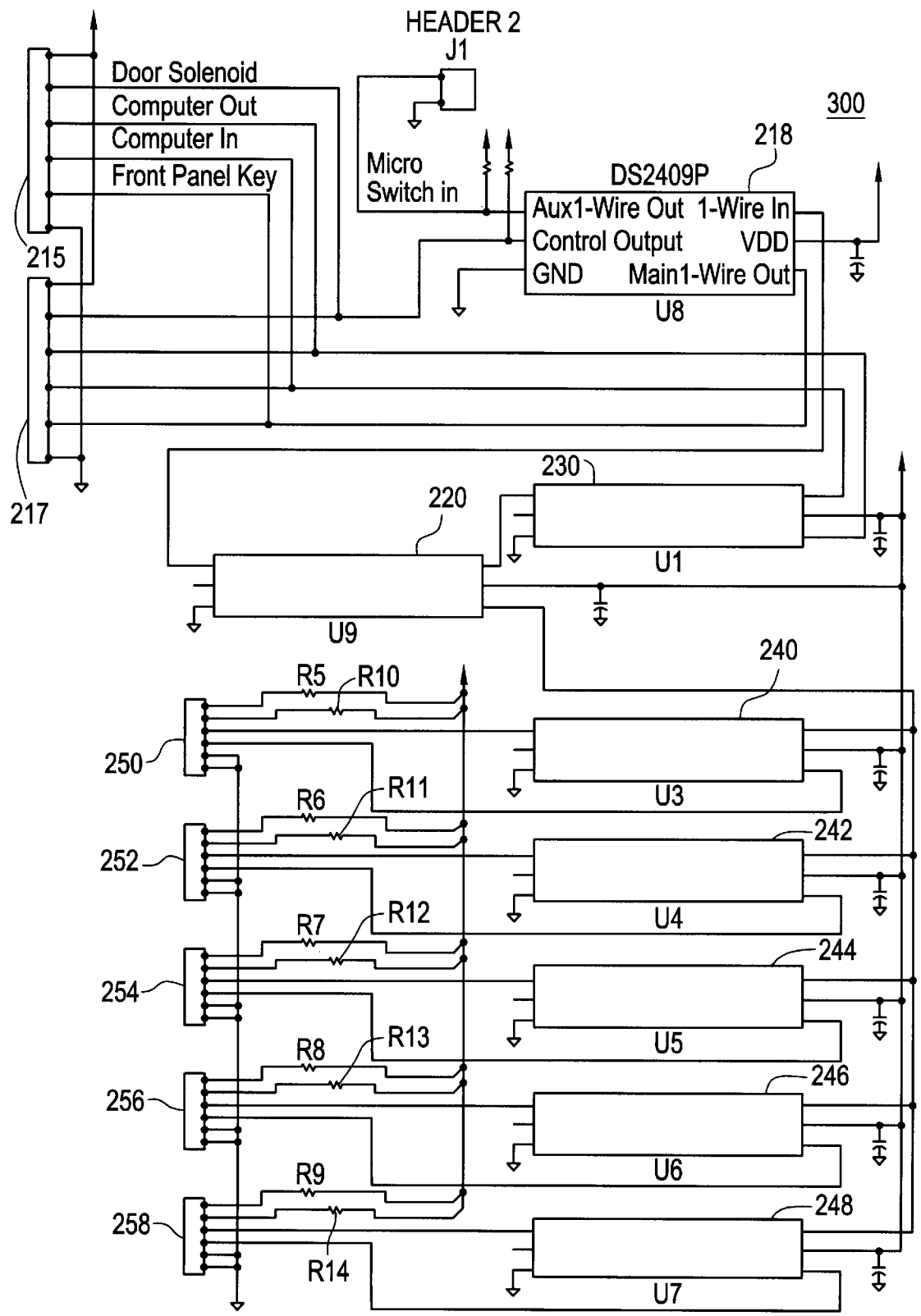
FIGS. 13 and 14 are schematic diagrams of a control system according to one embodiment.
Figure 14:
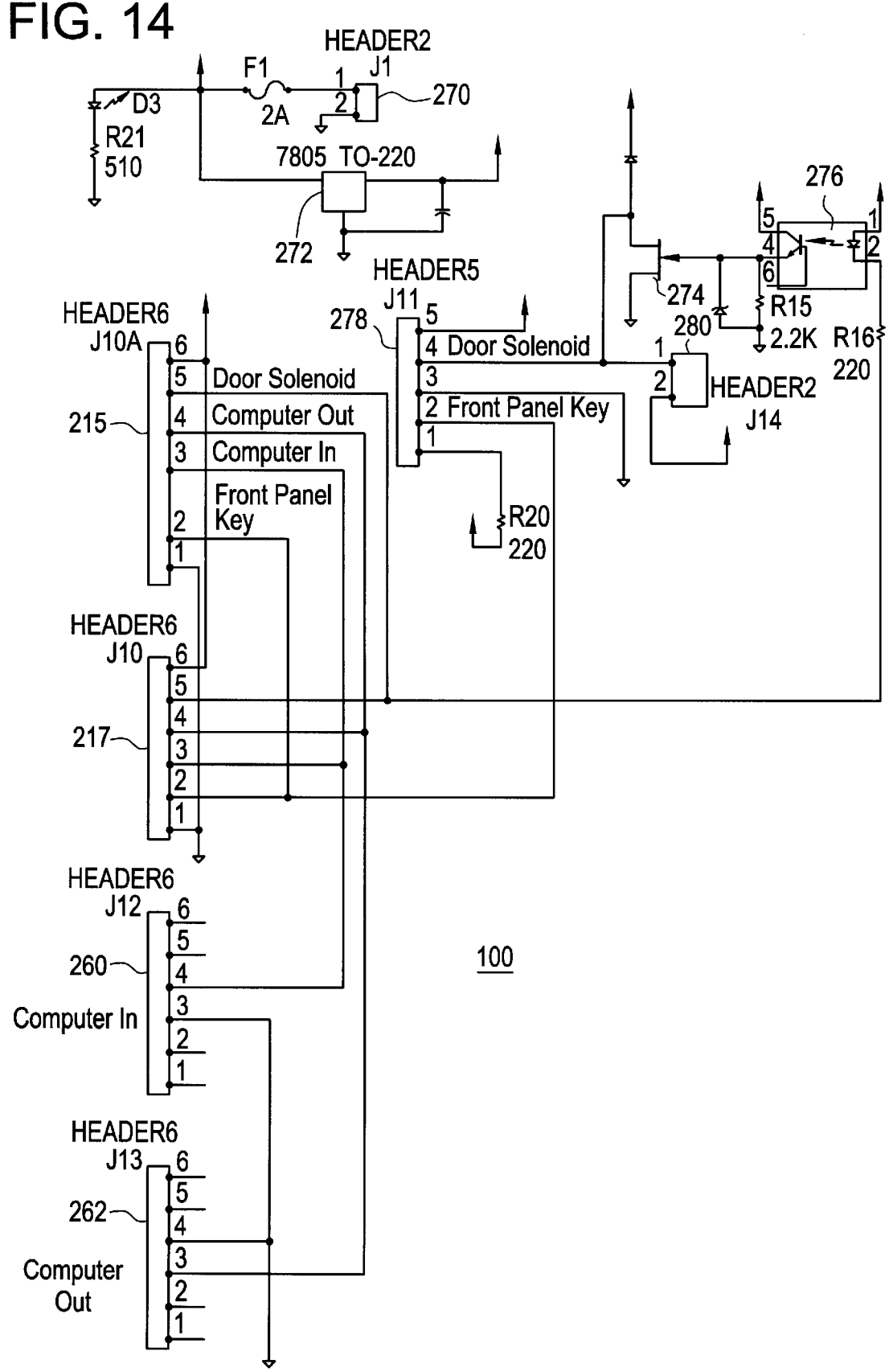
Figure 15:
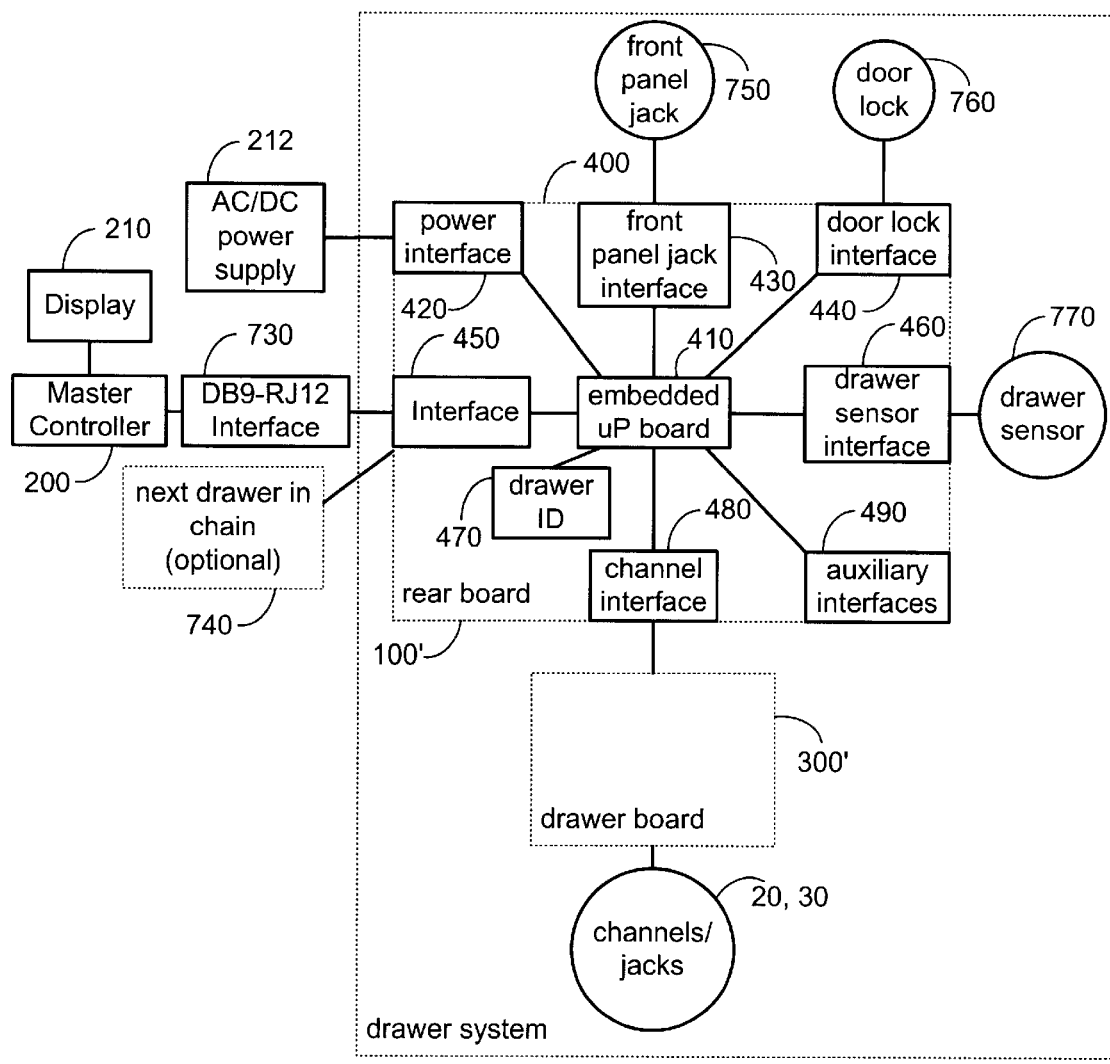
FIG. 15 is a block diagram of a control system according to another embodiment.

FIGS. 13 and 14 illustrate the circuit boards 100 and 300 according to one embodiment. FIGS. 15–22 illustrate alternative embodiments of the circuit boards 100 and 300. In each embodiment, a master controller, e.g., a computer executing a software program and managing a database, accesses the circuit boards and obtains information from the drawer system, which information is used by the software program to manage the database, etc.

Turning to FIG. 13, one form of the circuit board 300 is described. A standard 6-pin interface 215 is used to interface to the cable 500 which is coupled to the circuit board 100. An identical connector 217 can be used to allow an alternate placement of the interface cable. The controller is coupled through the interface 215 to a drawer branch coupler 230. The drawer branch coupler 230 in turn is connected to a control/channel branch coupler 220. The control/channel branch coupler 220 is in turn connected to a lock/sensor branch coupler 218. The control/channel branch coupler 220 is also connected to a plurality of string branch couplers 240, 242, 244, 246 and 248. Each of the string branch couplers 240–248 is coupled to a corresponding interface connector 250–258, respectively, that interfaces with two corresponding strings of jacks 30. For example, string branch coupler 240 interfaces with strings 1 and 2 in channel 1, string branch coupler 242 interfaces with strings 3 and 4 in channel 2, etc. The couplers 218, 220, 230 and 240–248 are 1-wire couplers, such as the DS2409P coupler made and sold by Dallas Semiconductor, Inc.

Use of a 1-wire type coupler is advantageous because the coupler maintains a common ground level for the entire network and keeps inactive segments powered, as opposed to approaches that switch the ground line. This makes supply of power easier to manage and prevents loss of status of parasitically powered devices. Additional information about the DS2409P 1-wire coupler can be obtained from Dallas Semiconductor, and is well known in the art. The couplers can be connected to each other and to 1-wire memory devices, such as the type included in the plug units 60.

Each coupler has six pins: Pin 1 is ground, pin 2 is the input data/control, pin 3 is main 1-wire data/power, pin 4 is auxiliary 1-wire data/power, pin 5 is control output, and pin 6 is $V_{DD}$ (power). From the 2-pin interface 216, a Micro Switch Sense signal (drawer close status) is coupled to the auxiliary 1-wire output pin 4 of the lock/sensor branch coupler 218 and a Door Solenoid (lock) signal line is coupled to the control output pin 5. A control/communication path is established between the 1-wire input pin 2 of lock/sensor branch coupler 218 and the auxiliary 1-wire output pin 4 of the control/channel branch coupler 220. A control/communication path is established between the main 1-wire output pin 3 of control/channel branch coupler 220 and the 1-wire input pin 2 of each of the string branch couplers 240–248.

A string branch coupler and a channel interface are connected as follows. The auxiliary 1-wire output pin of string branch coupler 240 is coupled to pin 4 of the connector 250 that connects to string 1 of jacks. The main 1-wire output pin 3 of the string branch coupler 240 is coupled to pin 3 that connects to string 2 of jacks. Similarly, the auxiliary 1-wire output pin 4 of string branch coupler 242 is coupled to pin 4 of connector 252 that connects to string 3 of jacks and the main 1-wire output pin 3 of the string branch coupler 242 is coupled to pin 3 of connector 252 that connects to string 4 of jacks. The string branch couplers 244, 246 and 28 connect to the interface connectors 254, 256 and 258, respectively, in a similar manner. The interface connectors 250–258 are, for example, RJ-11 connectors. Two current limited 5 volt signals are also passed through the connectors 250–258. The current limiting is to keep potential shorts from developing between 5 volts and ground and also to keep from overdriving the LEDs that are housed in the plug units. The ground signal is also passed to all of the channels.

FIG. 14 shows the schematic diagram of the to the circuit board 100 according to one embodiment. The interface between the master controller, such as a PC, and between other drawer systems is provided through headers 260 and 262. Header 260 provides a path for 1-wire communications to the master controller 200. Header 262 provides a path for 1-wire communications to another drawer system. There may be additional drawer systems connected between header 260 and the master controller 200. For the purposes of discussion, these drawers are considered upstream. Drawers connected to header 262 are considered downstream. Generally, data that is meant for downstream drawers will be passed from header 260 to header 262 via the 1-wire drawer branch coupler 230 described above. Likewise, data from downstream that is meant for the master controller will be passed from header 262 to header 260.

Twelve volt DC power is obtained through the header 270. The header 270 may be designed to protrude out the back of the drawer chassis when the board is mounted at the inside rear of the chassis. A fuse, F1, is provided to protect the external power supply and the internal circuitry if a power short develops. An LED, D3 that also protrudes from the drawer chassis, lights to indicate when the board is powered. In addition to a 12 volt supply, 5 volts is used by the board circuitry and is provided through a voltage regulator 272. This regulator is rated for at least 1 amp operation, for example. A heat sink is generally required on the regulator to help dissipate heat.

A door lock 760 (FIG. 12B) may require 12 volts with a fairly large current draw. A MOSFET 274, such as a Q1 RFD3055, is used to drive the door lock. The controller drives the door lock with the door solenoid signal that is accessed through the lock/sensor branch coupler 218 on the other board. The signal then drives an opto-isolator 276, such as an MCT2E, that in turn drives the MOSFET 274. The opto-isolator protects the lock/sensor branch coupler 218 in case of MOSFET failure. It also inverts the control logic for the MOSFET 274 which keeps the drawer from unlocking during power-up. The signals to/from the door lock 760 and the front panel jack 750 (FIG. 12B) are provided by the connector 278. The connector 280 is used to provide power to future auxiliary components.

FIG. 14 also shows the 1-wire connections, except for the front panel jack connection, to the connector 215. As described above, connector 215 provides a path, through a ribbon cable 500, to the circuit board 300 and ultimately to the jacks 30 located on the channels 20. In addition, 5 volts and ground is also passed through the connector 215 to provide power for the plug unit LEDs and a reference ground.

In operation, the couplers route data/control signals from the controller 200, and are used to uniquely identify each drawer, the lock/control status mechanism in each drawer, and ultimately each string of jacks in each drawer. The controller 200, through software executed thereby, accesses the couplers to identify drawers, check drawer open/close status, unlock drawers, scan strings of jacks to plug unit identification, perform FOB identification, etc. Consequently, the controller 200 is able to look up an object, such as a key, in a database, to find its corresponding electronic identifier (ID). The controller 200 then sends a signal through the interface connector 215 into the network of couplers to activate the LED on the plug unit corresponding to the electronic ID in any location that it may reside. Multiple plug units can be activated simultaneously for quick retrieval. Plug units and their corresponding object can be replaced in any drawer at any location because the controller automatically recognizes the plug unit upon its placement in a jack. Moreover, because the plug units are self-identified by activating their LED when installed in any jack as opposed to in a particular storage location, it is possible to have a mix of different shapes and sizes of storage containers in a facility, all access controlled using the same controller and user interface.

FIGS. 15–22 show another configuration as an alternative to that shown in FIGS. 13 and 14. The circuit board 100' shown in FIG. 15 contains an embedded microprocessor board 410, such as a Rabbit Semiconductor RCM2010, to provide local control of the drawer system. Other microprocessors are suitable. The embedded processor utilizes its digital inputs and outputs to communicate with the various interface circuitry. There is a power interface 420, a front panel jack interface 430, a door lock interface 440, a master controller interface 450, a drawer interface 460, a drawer ID circuit 470, a channel interface 475 and an auxiliary interface 490. The power interface 420 provides an interface to AC/DC power supply 212. The front panel jack interface 430 interfaces with the front panel jack 750. The door lock interface 440 interfaces with the door lock 760. The master interface, is for example, an RS232 interface that couples to a DB9-RJ12 interface 730, which in turn is connected to the master controller (PC) 200 and to a next drawer 740 in a chain (if there are multiple drawers in the system). The drawer sensor interface 460 interfaces with the drawer sensor 770 that is positioned in the drawer chassis in a variety locations, one of which is shown in FIG. 12B. The channel interface 480 interfaces with the circuit board 300', which in turn couples to the jacks 30 on the channels 20. The circuit board 100' may be designed such that when it is mounted, the RS232 connectors (such as RJ12), power connector, and power indicator (such as an LED) extrude through the chassis. This is to provide access from the outside of the chassis with the connectors mounted directly to the board. The circuit board 300' provides an additional connector conversion and current limiting between the circuit board 300' and the channels 20 of jacks 30.

Figure 16:
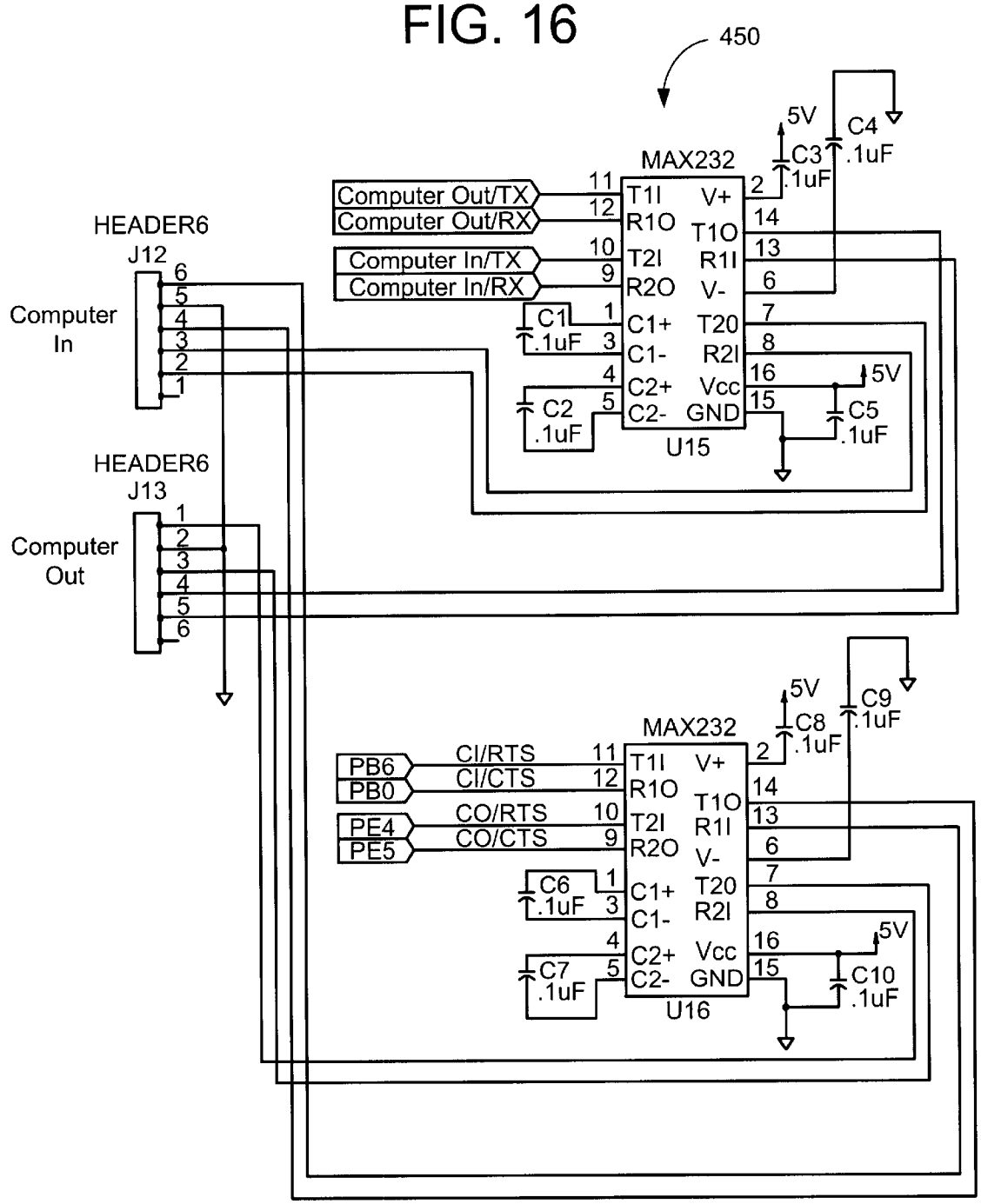
FIG. 16 is a schematic diagram of the master controller interface of the control system shown in FIG. 15.

Turning to FIGS. 16–21, the circuit board 100' will be described in detail. The master interface 450 between embedded microprocessor board 410 and the master controller 200, and between the board 410 and the next drawer 740 in the chain, is shown in FIG. 16. Header J12 provides a path for RS232 communications to the master controller 700. Header J13 provides a path for RS232 communications to another drawer system. There may be additional drawer systems connected between header J12 and the master controller. For the purposes of discussion, these drawers are considered upstream. Drawers connected to header J13 are considered downstream. Generally, data that is meant for downstream drawers will be passed from header J12 to header J13 via the embedded microprocessor 410. Likewise, data from downstream that is meant for the master controller will be passed from J13 to J12. In certain circumstances, the data from a downstream drawer may first be manipulated by the current drawer system. For example, if there is a global request by the master controller to get drawer IDs, the current drawer system may pass the request downstream. When the response from downstream is returned, the current drawer system may append its ID to the message and send it upstream.

Still referring to FIG. 16, the RS232 signals are converted to/from standard digital 5 volt signals using a RS232 interface IC U15 such as the MAX232. Interface IC U15 is used to convert the transmit and receive signals while interface IC U16 is used to convert the request to send (RTS) and clear to send (CTS) signals. The 5 volt signals are passed to the serial port pins of the microprocessor 410.

Figure 17:
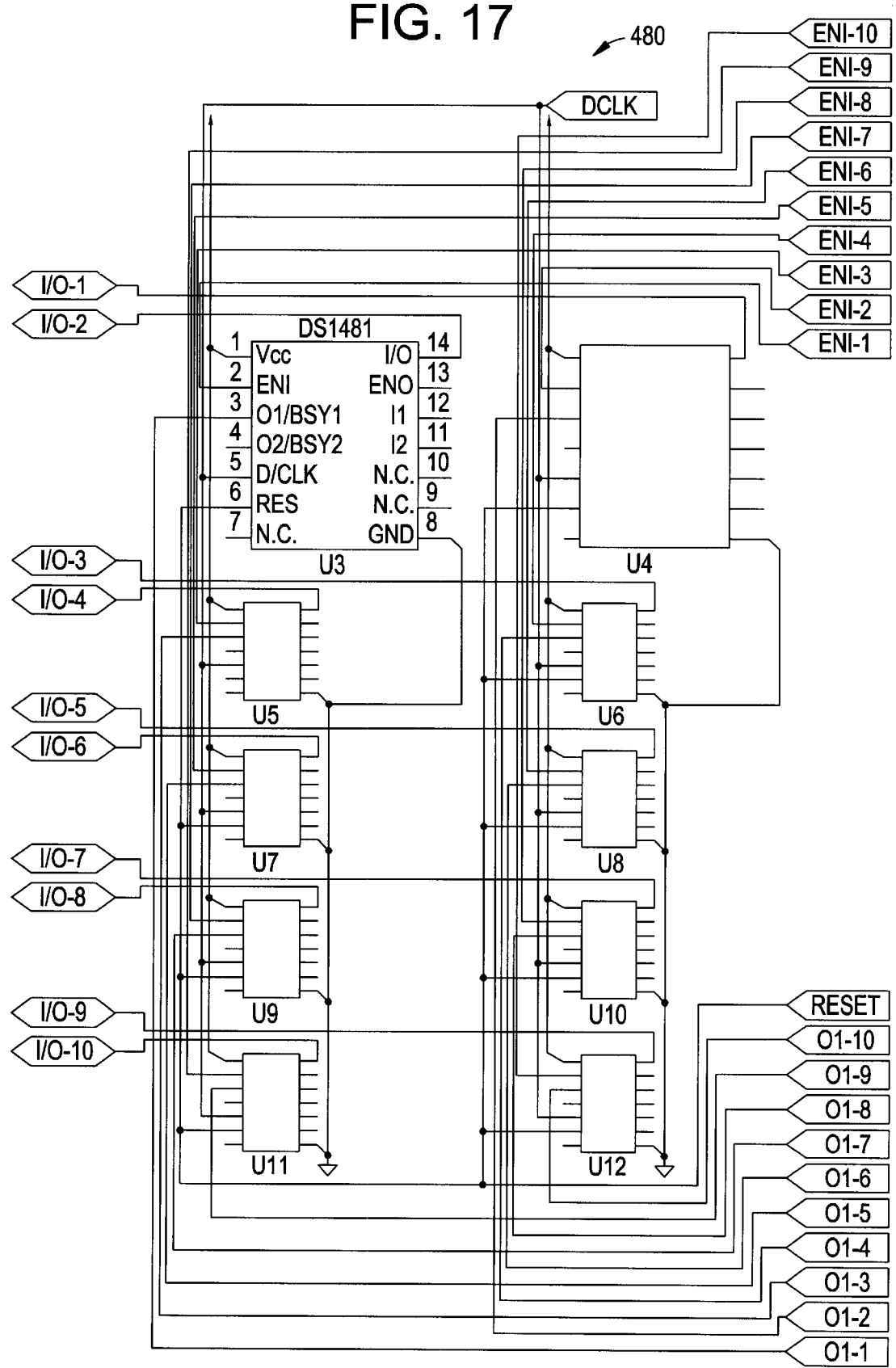
FIG. 17 is a schematic diagram of the channel interface.

FIG. 17 shows the channel interface 480 between the microprocessor 410 and the data lines that will eventually reach the channel jacks, and ultimately a plug unit. The 1-wire communication protocol is followed as specified by Dallas Semiconductor, Inc. One method of providing 1-wire communications from an embedded microprocessor is to utilize an interface IC, such as the DS1481 interface, manufactured by Dallas Semiconductor, Inc. The DS1481 is a dedicated 1-wire timing generator and is normally used in conjunction with a parallel port controller to provide the necessary interface between 1-wire devices, such as the 1-wire memory device and the host processor. This IC is controlled by the microprocessor through the ENI, D/CLK, and RES lines. The microprocessor can get the IC status through the O1/BSY1 line. The I/O line provides the 1-wire line that can be electrically connected to 1-wire devices, such as the plug unit. The protocol for these lines can be found datasheets for the IC published by Dallas Semiconductor. Referring again to FIG. 17, there are ten DS1481 ICs, designated U3 through U12, used to communicate to plug units in each of the ten strings or subsets of receptacles, two strings per channel. This isolates the strings (subsets) such that if one string (subset) malfunctions, the other strings are not affected. In addition, this novel approach of separate string control provides substantially simultaneous processing of the strings (subsets) of receptacles. This is possible, even with a single microprocessor since the DS1481 protocol provides a large amount of time where the microprocessor is waiting on a result in response to a query. During this wait time, the microprocessor can be accessing another DS1481. This novel approach allows the discovery rate of 1-wire devices, such as the plug unit, to exceed the generally accepted maximum.

Figure 18A:
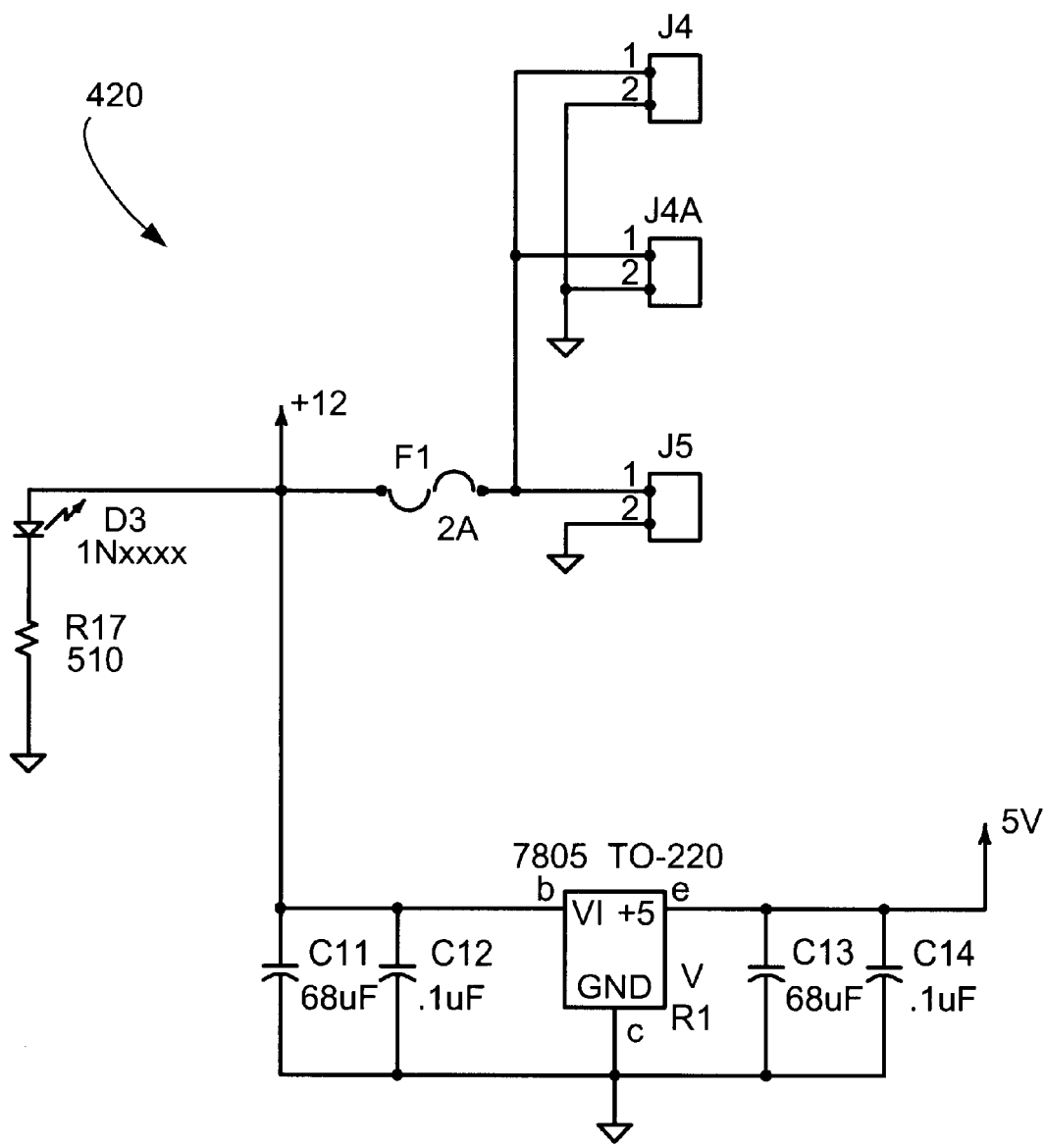
FIG. 18A is a schematic diagram of the power interface.
Figure 18B:
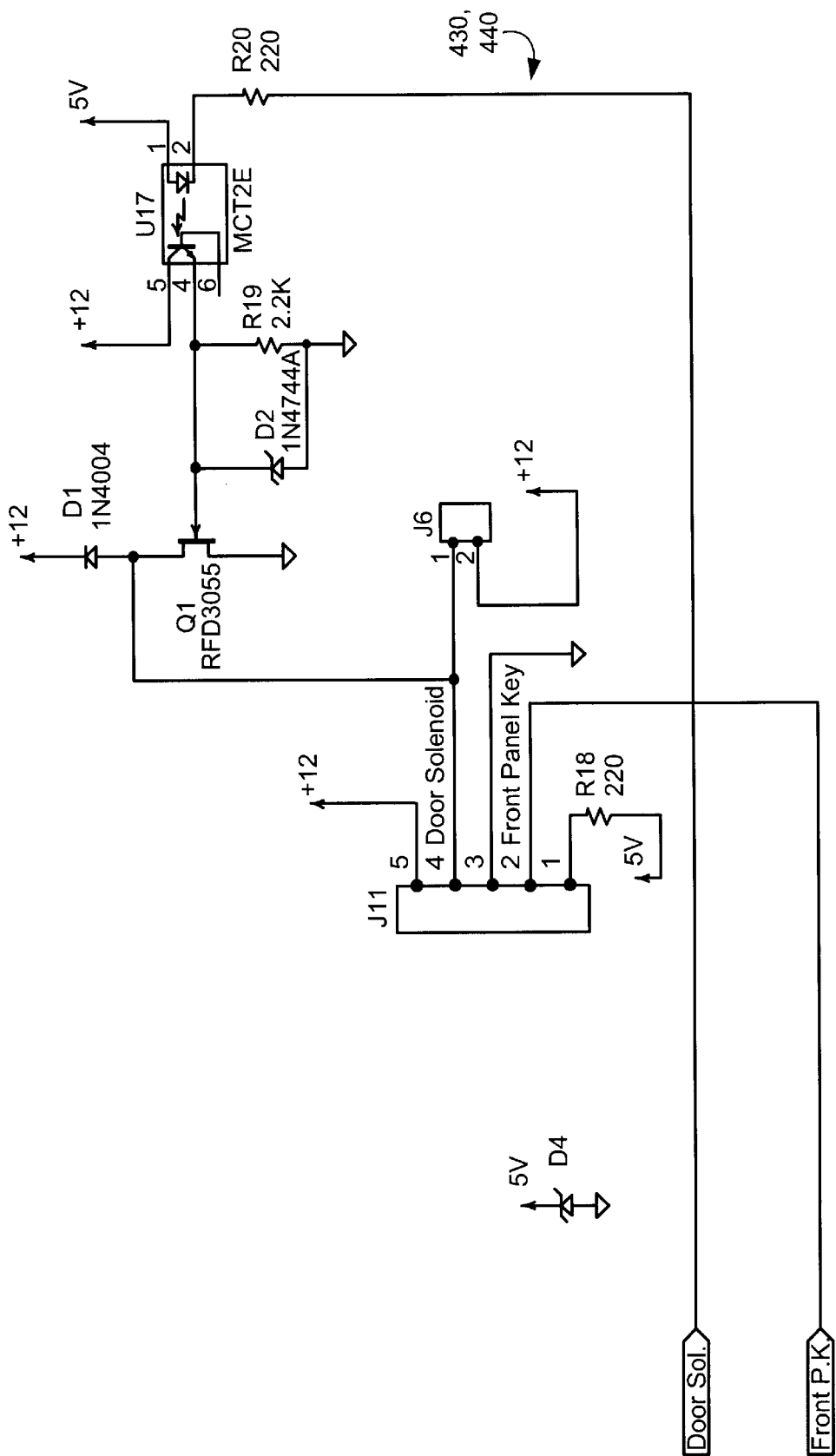
FIG. 18B is a schematic diagram of a portion of the front panel jack interface and the door lock interface.

FIG. 18A shows the power interface 420 and FIG. 18B shows the door lock interface 440 and a portion of the front panel jack interface 430. With reference to FIG. 18A, twelve volt DC power is obtained through the connector J5. This power is output through the connectors J4 and J4A for future auxiliary power. The connector J5 is designed to protrude outward from the back of the drawer chassis when the board is mounted at the inside rear of the chassis. A fuse, F1, is provided to protect the external power supply and the internal circuitry if a power short develops. The power LED indicator 765 (corresponding to D3 in FIG. 18A) also protrudes from the front of drawer chassis as shown in FIG. 12B and lights to indicate when the board is powered. In addition to the 12 volt supply, 5 volts is also required by the board circuitry. This is provided through a voltage regulator, 7805. This regulator should be rated for at least 1 amp operation. A heat sink is generally required on the regulator to help dissipate heat.

Referring to FIG. 18B, the door lock interface 440 and part of the front panel jack interface 430 is shown. The door lock 760 may require 12 volts with a fairly large current draw. A MOSFET, such as Q1 RFD3055, is used to drive the door lock 760. The microprocessor 710 drives the door lock with the door solenoid signal. This signal then drives an opto-isolator U17, such as a MCT2E, that in turn drives the MOSFET. The opto-isolator U17 protects the microprocessor 410 in case of MOSFET failure. It also inverts the control logic for the MOSFET which keeps the drawer from unlocking during power-up. The signals to/from the door lock and the front panel jack are provided by the J11 connector. The J6 connector is used to provide power to future auxiliary components.

Figure 19A:
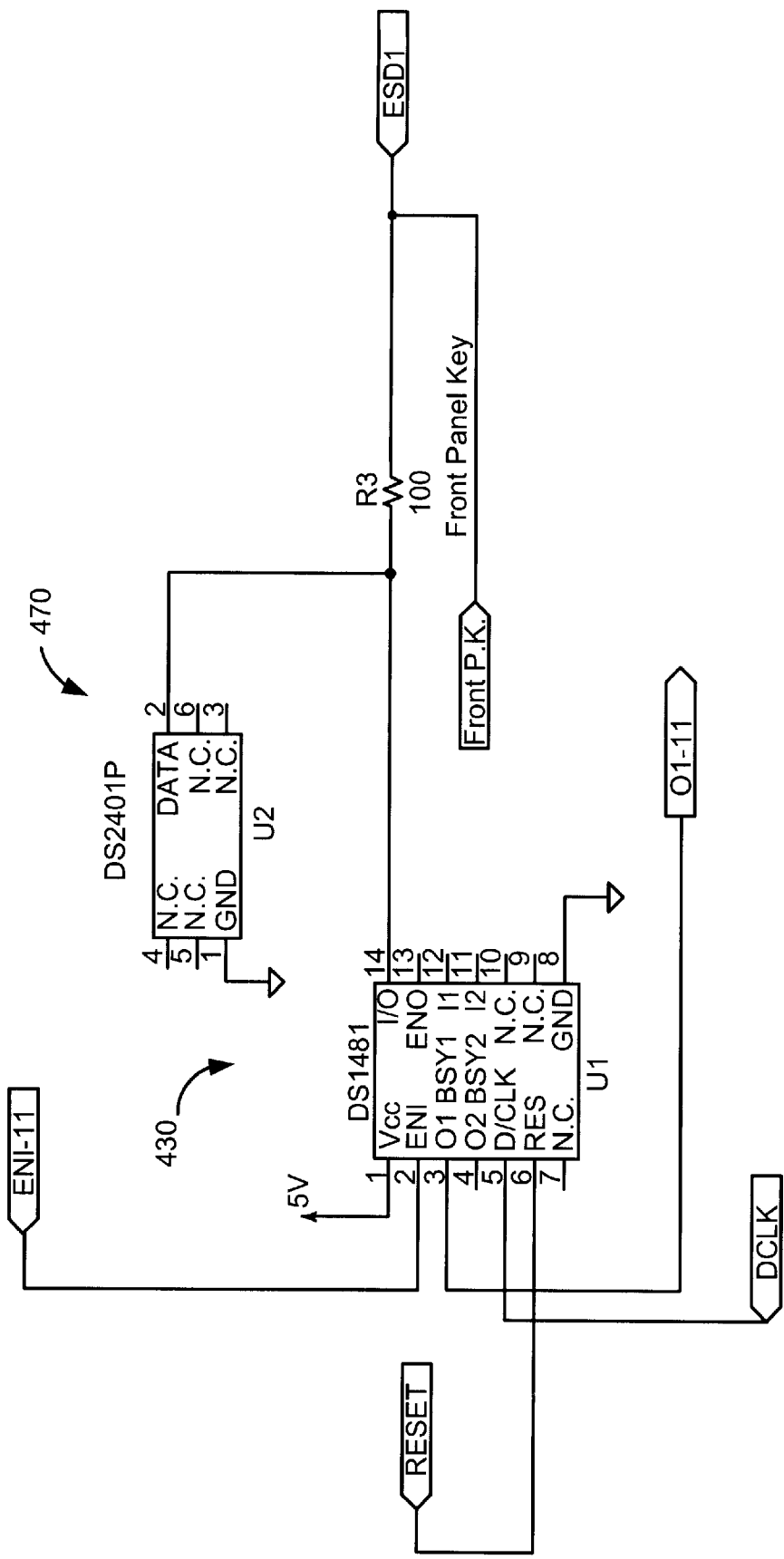
FIG. 19A is a schematic diagram of the front panel jack interface and the drawer identification circuitry.
Figure 19B:
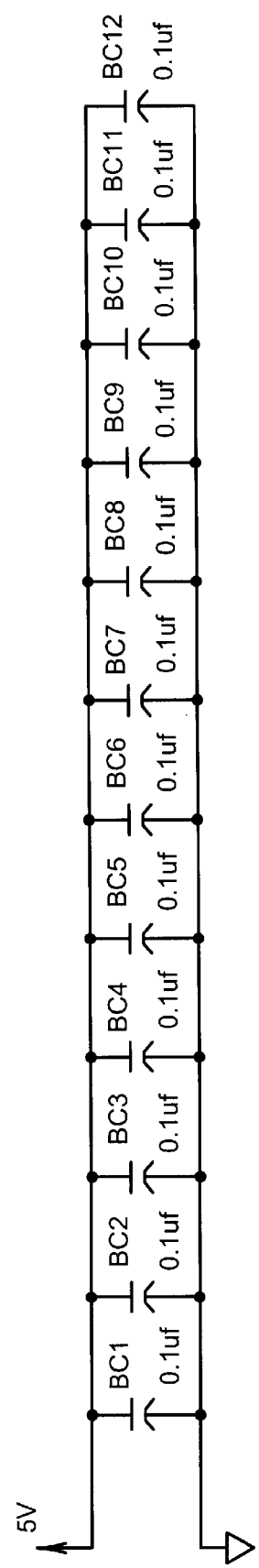
FIG. 19B is a schematic diagram of a capacitor network used in the control system shown in FIG. 15.

With reference to FIG. 19A, the front panel jack interface 430 comprises a DS1481 U1. As with the channel interface 480, this IC provides an interface between the microprocessor and 1-wire devices. This IC is connected to the front panel jack and also to an ID chip, such as the DS2401P U2. The ID chip U2 provides an ID that is unique to the drawer system. FIG. 19B illustrates a network of bypass capacitors useful for noise protection on the power supply. The capacitor network is connected near the power connections for the integrated circuits. FIG. 19C illustrates the auxiliary interfaces 490.

Figure 20A:
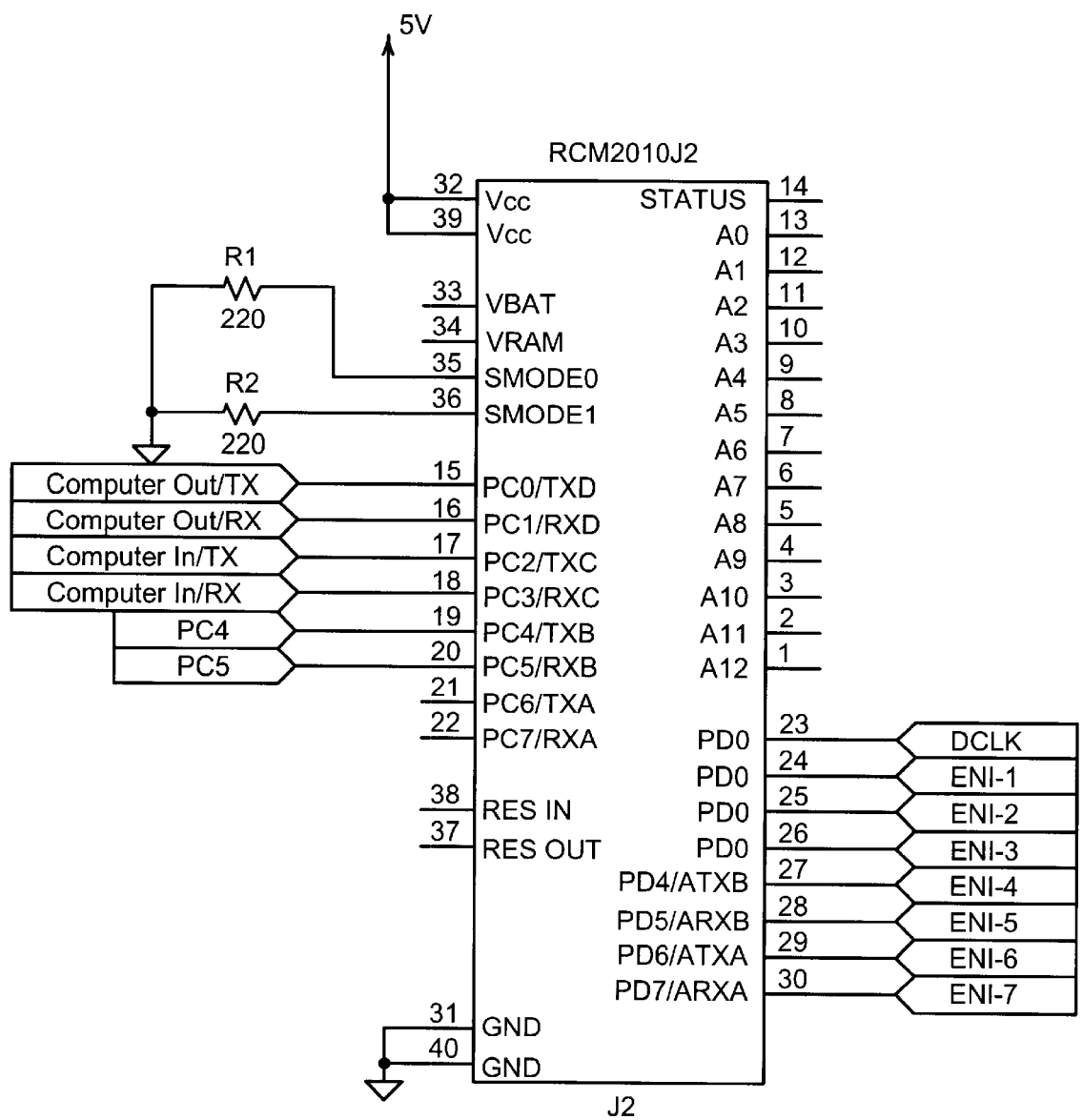
FIGS. 20A and 20B are schematic diagrams showing connection of a microprocessor board in the control system of FIG. 15, and showing the drawer sensor interface.
Figure 20B:
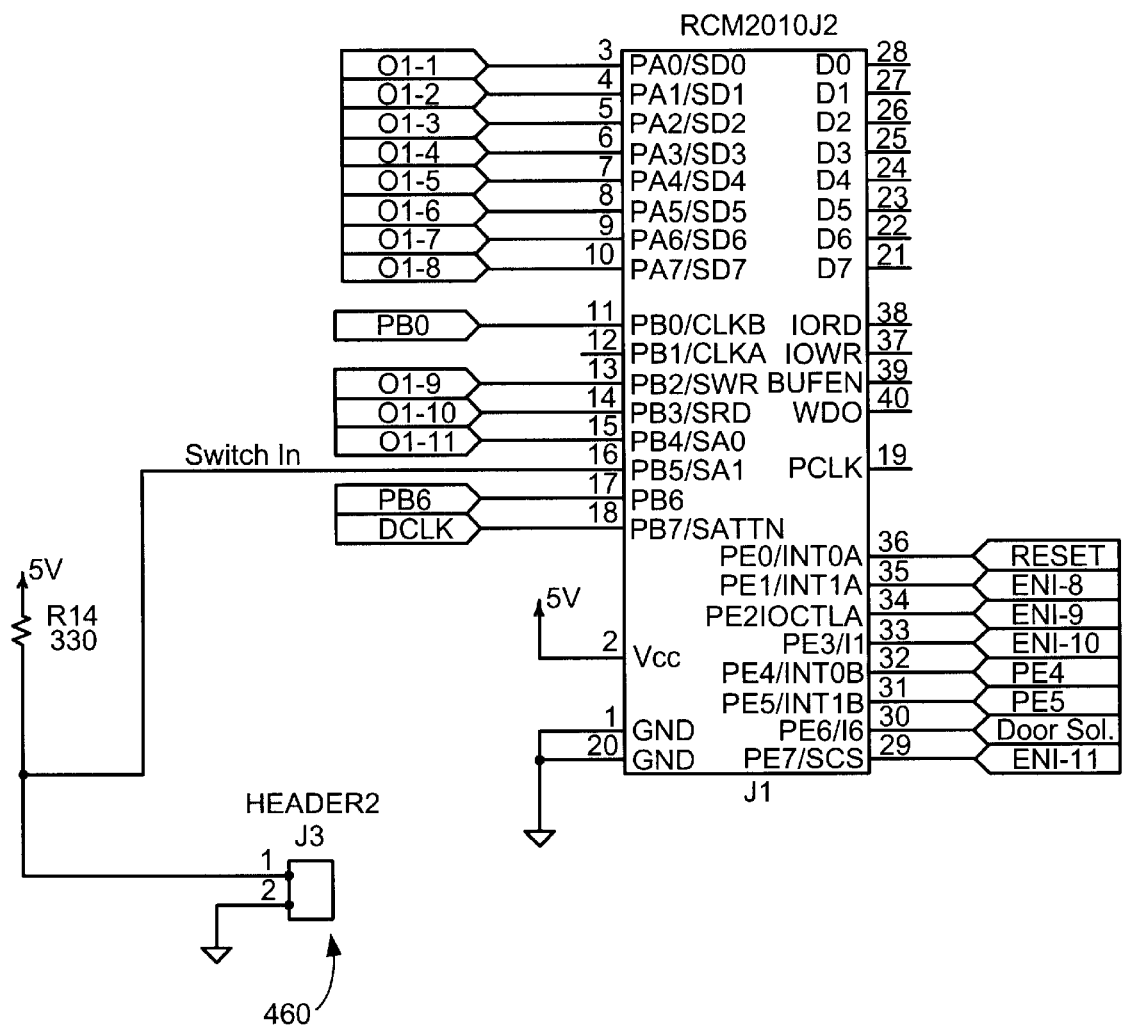

The microprocessor 410 provides local control of the drawer system. The microprocessor 410 receives requests from the master controller 700, performs the function, and returns the results to the master controller 700. Examples include scanning for plug units, testing for drawer status (opened/closed), unlocking or locking the drawer, returning its ID, checking for presence of a plug unit in the front panel jack, and lighting or unlighting plug units. The microprocessor 410 is located on a separate printed circuit board that connects to the circuit board 100' via two connectors J1 and J2 shown in FIGS. 20A and 20B. These connectors pass power to the microprocessor board and provide all input and output signals required by the microprocessor 410 to properly control the drawer system. An additional item shown in FIG. 20B is the drawer sensor interface 460 (connector J3) for the drawer sensor 770 (FIG. 12A) that determines if the drawer is opened or closed.

Figure 21:
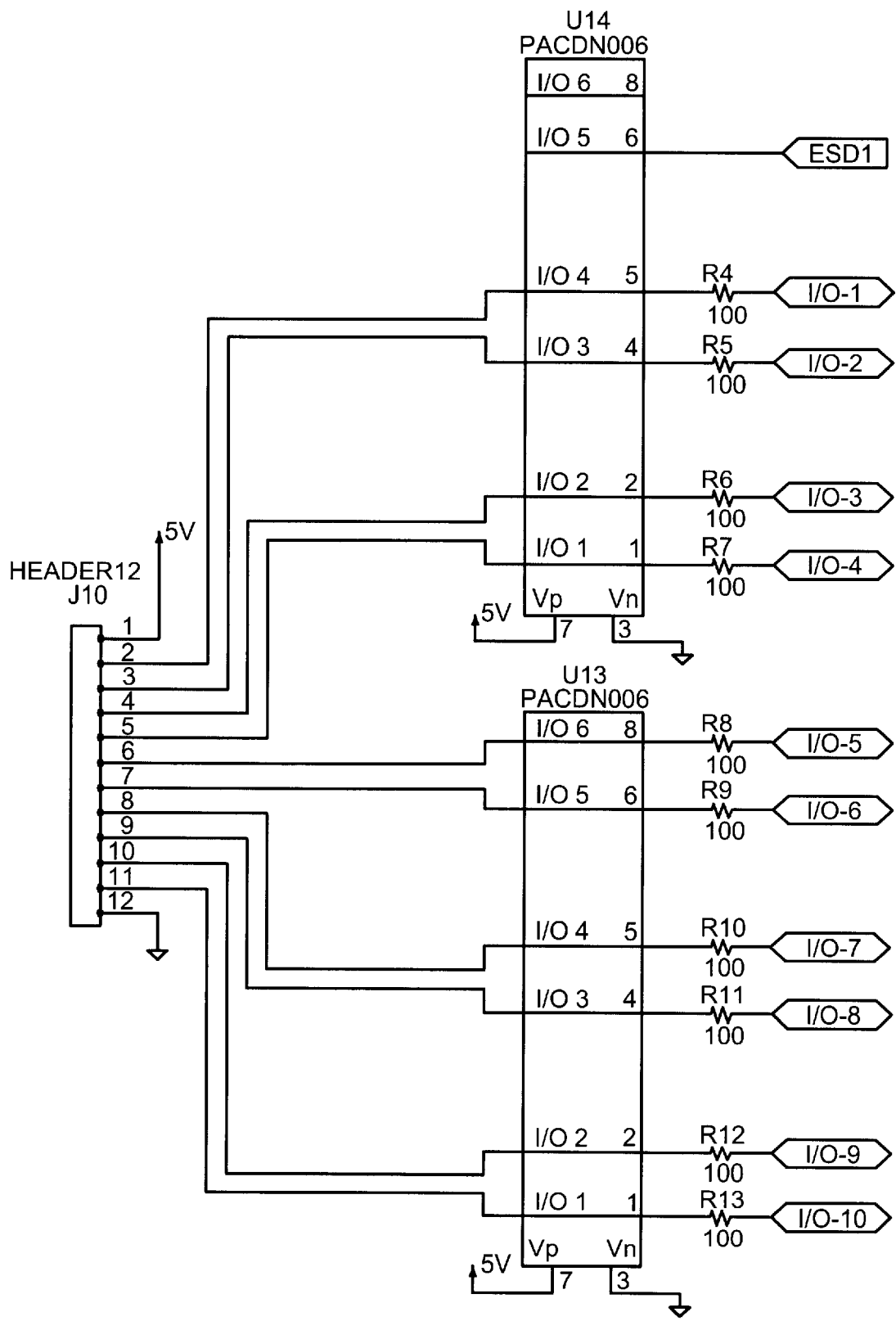
FIG. 21 is a schematic diagram showing integrated circuits useful to provide electrostatic discharge protection.

Electrostatic discharge protection for all 1-wire interfaces is provided by ICs U13 and U14, such as a PACDN006, as shown in FIG. 21. This figure also shows the 1-wire connections, except for the front panel jack connection, to the connector J10. This connector provides a path, through a ribbon cable, to the circuit board 300' and ultimately to the jacks located on the channels. In addition 5 volts and ground is also passed through the connector to provide power for the plug unit LEDs and a reference ground.

Figure 22:
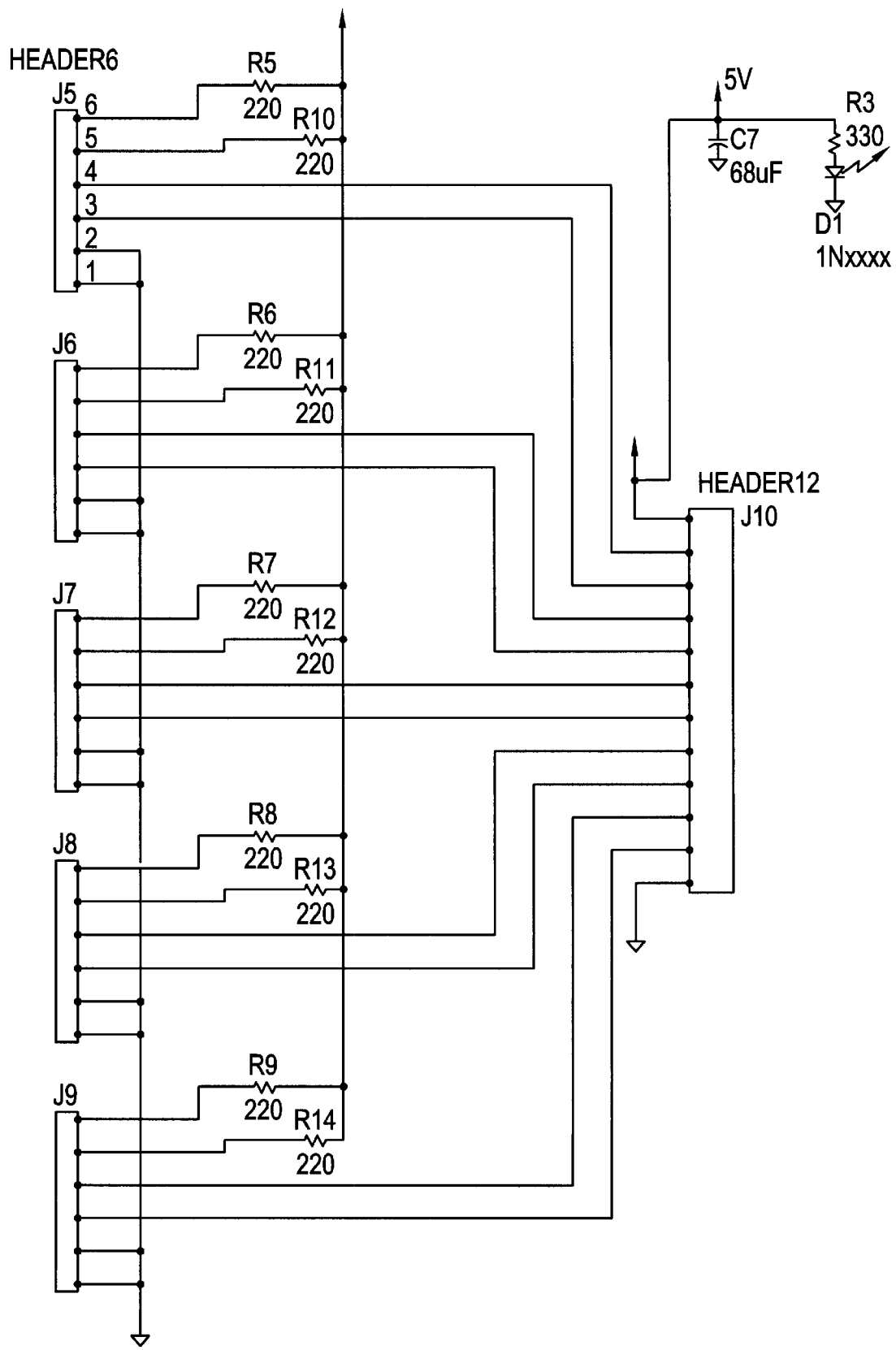
FIG. 22 is a schematic diagram of another circuit board of the control system shown in FIG. 15.

A schematic of the circuit board 300' located at the back of the storage drawer is shown in FIG. 22. This board receives 1-wire data lines from the circuit board through the connector J10 (FIG. 21). It also receives 5 volts and a ground signal. These signals are then passed onto connectors J5 through J9 (which may be RJ12 connectors for example) that are connected to the channels. The 5-volt signal is also passed to the channels, through resistors R5 through R14. These resistors restrict the maximum current that can flow through the lines. This is to keep potential shorts from developing between 5 volts and ground and also to keep from overdriving the LEDs that are housed in the plug units. The ground signal is also passed to all of the channels. Finally, an LED D1 is provided to indicate that power is being applied to the board.

The above description is intended by way of example only.

What is claimed is:

1. A system for tracking objects comprising:
   a container;
   a plurality of electrical jacks each at a corresponding storage location in the container, each electrical jack being an integrated and enclosed structure having an opening at one end thereof;
   a plurality of plug units capable of fitting through the opening of any one of the electrical jacks, each plug unit comprising an object attachment member to attach to an object to be tracked, a memory device storing a unique identifier and an elongated plug member electrically connected to the memory device and suitable for fitting through the opening in one of the electrical jacks to make electrical contact therewith; and
   a controller coupled to the plurality of electrical jacks to read the identifier of any memory device of a plug unit when the plug unit is installed in any electrical jack.

2. The system of claim 1, and further comprising one or more lines providing power, data and/or control to the electrical jacks which is in turn coupled to a plug unit when inserted therein.

3. The system of claim 2, wherein one or more lines comprises a free-standing conductive wire connected between adjacent electrical jacks to carry data or control thereto.

4. The system of claim 3, and further comprising a cable body supporting the one or more conductive wires between adjacent electrical jacks.

5. The system of claim 3, and further comprising a printed circuit board extending between adjacent electrical jacks and having etched therein the one or more conductive wires.

6. The system of claim 1, and further comprising a ground line electrically connected between each electrical jack and connected to a ground.

7. The system of claim 1, wherein each memory device is a type which is capable of being electrically accessed for read and write operations by one wire.

8. The system of claim 1, and further comprising a plurality of channel members mounted in the container, each channel member having a horizontal surface comprising a plurality of holes each of which receives an electrical jack therethrough such that access to the electrical jacks is provided in the space above the horizontal surface.

9. The system of claim 1, wherein each plug unit comprises a light that is illuminated in response to a command from the controller.

10. The system of claim 1, wherein the plug unit comprises:
    a housing;
    an electrically conductive plug member extending outward from one end of the housing; and
    a circuit board disposed within the housing on which the memory device is attached and electrically connects with the plug member.

11. The system of claim 10, wherein the plug unit further comprises a light element disposed on the circuit board capable of illuminating in response to a signal from the controller coupled to it through an electrical jack.

12. The system of claim 10, wherein the plug unit further comprises a lens disposed on an open portion of the housing to communicate light from the light element outward from the housing.

13. The system of claim 1, wherein the plurality of electrical jacks are electrically connected in series.

14. A container for containing a plurality of objects to be tracked, comprising:
    a container body having a closed bottom and defining a bottom surface and open top;
    at least one horizontal surface which stands above the bottom surface of the container body; and
    a plurality of electrical jacks mounted through holes in the horizontal surface to allow for access from the open top of the container and thereby defining a plurality of storage locations, wherein each electrical jack is an integrated and enclosed structure having an opening at one end thereof.

15. The container of claim 14, and further comprising a plurality of separate horizontal surfaces disposed in the container body above the bottom surface of the container body, wherein subsets of the plurality of electrical jacks are disposed on each of the plurality of separate horizontal surfaces.

16. The container of claim 15, and further comprising a plurality of channels, each of which defines one of the plurality of horizontal surfaces and further defines two vertical portions that extend from the horizontal surface of each channel to the bottom surface of the container body.

17. The container of claim 14, wherein the container body is a drawer which slides in and out of a drawer housing.

18. The system of claim 14, wherein the plurality of electrical jacks are electrically connected in series.

19. A unit for attachment to or association with an object to be tracked, comprising:

a housing;

an electrically conductive plug member extending outward from one end of the housing; and a circuit board disposed within the housing and electrically connected to the plug member; and a memory device attached to the circuit board, the memory device storing a unique identifier to be associated with an object to be tracked.

20. The unit of claim 19, and further comprising a light element disposed on the circuit board capable of illuminating responsive to a suitable signal.

21. The unit of claim 20, and further comprising a lens disposed on an open portion of the housing to communicate light from the light element outward from the housing.

22. The unit of claim 19, and further comprising an attachment ring attached to the housing, the attachment ring suitable for attaching to a key.

23. The unit of claim 19, wherein the housing is elongated and the plug member is elongated and extends outward from one end of the housing.

24. The unit of claim 19, wherein the plug member comprises a first conductive element for connection to a power supply, a second conductive element for connection to a data line, and a third conductive element for connection to ground.

25. The unit of claim 19, wherein the circuit board comprises a first conductor for connection to the first conductive element and a second conductor for connection to the second conductive element, wherein the first and second conductors electrically connect to power supply and data terminals of the memory device.

26. The unit of claim 19, wherein the first conductor of the circuit board is defined around a hole in the circuit board which receives one end of the plug member therein.

27. The unit of claim 19, wherein the memory device is of a type capable of being electrically accessed for read and write operations with one wire.

28. A system for tracking objects comprising:

a plurality of electrical jacks each at a corresponding storage location, wherein each electrical jack is an integrated and enclosed structure having an opening at one end thereof;

a plurality of object tracking units each capable of mating with any one of the electrical jacks, each object tracking unit having an object attachment member to attach to an object to be tracked and a memory device storing a unique identifier which can be accessed via the data line; and a controller capable of reading the identifier of any memory device of an object tracking unit when its plug is installed in any electrical jack;

a plurality of interfaces, each interface connected between the controller and a unique subset of electrical jacks of the plurality of electrical jacks thereby isolating subsets of electrical jacks to enable the controller to separately process information to and from each subset of jacks.

29. The system of claim 28, wherein the controller can access multiple subsets of electrical jacks substantially simultaneously through an associated interface.

30. The system of claim 29, wherein while the controller is waiting for a response to a query of a subset of electrical jacks through one interface, the controller can transmit a query to another subset of electrical jacks through another interface.

31. The system of claim 28, and further comprising a processing section coupled between the plurality of electrical jacks and the controller, wherein the processing section comprises a microprocessor for handling local control of access to the plurality of electrical jacks, an interface to couple the microprocessor to the controller, and an interface to couple the microprocessor to the plurality of electrical jacks.

32. The system of claim 28, wherein the memory device comprises an addressable switch whose state can change or be read.

* * * * *